(12) United States Patent
Turisin et al.

(10) Patent No.: US 11,931,851 B2
(45) Date of Patent: Mar. 19, 2024

(54) POLE SANDER

(71) Applicant: Black & Decker Inc., New Britain, CT (US)

(72) Inventors: Marek Turisin, Niedernhausen (DE); Tim Heimrich, Bad Camberg (DE); Petr Dusik, Idstein (DE); Pablo Garcia Ramiro, Gragnano Trebbiense (IT)

(73) Assignee: Black & Decker Inc., New Britain, CT (US)

( * ) Notice: Subject to any disclaimer, the term of this patent is extended or adjusted under 35 U.S.C. 154(b) by 467 days.

(21) Appl. No.: 17/075,778

(22) Filed: Oct. 21, 2020

(65) Prior Publication Data

US 2021/0122004 A1    Apr. 29, 2021

(30) Foreign Application Priority Data

Oct. 23, 2019  (GB) ..................... 1915324
Dec. 23, 2019  (GB) ..................... 1919406

(51) Int. Cl.
*B24B 23/02*  (2006.01)
*B24B 7/18*   (2006.01)

(52) U.S. Cl.
CPC .............. *B24B 23/02* (2013.01); *B24B 7/184* (2013.01)

(58) Field of Classification Search
CPC .......... B24B 7/18; B24B 7/182; B24B 7/184; B24B 7/186; B24B 23/02; B24B 47/12; B24B 55/045
USPC ........................................ 451/354, 359, 451
See application file for complete search history.

(56) References Cited

U.S. PATENT DOCUMENTS

| | | | |
|---|---|---|---|
| 3,474,204 A | 10/1969 | Cork | |
| 3,793,781 A | 2/1974 | Hutchins | |
| 3,854,020 A | 12/1974 | Glover et al. | |
| 4,006,334 A | 2/1977 | Robotham et al. | |
| 4,329,078 A | 5/1982 | Crates | |
| 4,685,252 A * | 8/1987 | Ponce ..................... B24B 7/184 |
| | | | 451/356 |
| 4,782,632 A | 11/1988 | Matechuk | |
| 5,125,190 A | 6/1992 | Buser et al. | |

(Continued)

FOREIGN PATENT DOCUMENTS

CN    205559699 U    9/2016
CN    109227254 A    1/2019
(Continued)

OTHER PUBLICATIONS

English Translation of CN 109227254 A (Year: 2019).*
(Continued)

*Primary Examiner* — Joel D Crandall
(74) *Attorney, Agent, or Firm* — Amir R. Rohani

(57) ABSTRACT

A handheld pole sander is provided including an elongate body having two ends, an electric motor electrically controlled by control electronics, and a sanding head attached via a pivot mechanism to a first end of the elongate body. The sanding head includes a hood and an output spindle projecting from the hood and rotatably driven by the electric motor. At least part of the elongate body includes a heat conductive part being at least partially made of heat conductive material. The control electronics are mounted on the elongate body adjacent to or in direct contact with the heat conductive part of the elongate body.

15 Claims, 25 Drawing Sheets

(56) References Cited

U.S. PATENT DOCUMENTS

| | | |
|---|---|---|
| 5,127,762 A | 7/1992 | Havlovitz |
| 5,239,783 A * | 8/1993 | Matechuk ............ B24B 45/006 |
| | | 451/354 |
| 5,474,305 A | 12/1995 | Flower et al. |
| 5,511,269 A * | 4/1996 | Watson ............... A47L 11/4036 |
| | | 15/28 |
| 5,545,080 A * | 8/1996 | Clowers ................. B24B 7/184 |
| | | 451/354 |
| 5,690,545 A | 11/1997 | Clowers et al. |
| 5,885,145 A | 3/1999 | O'mara |
| 6,053,805 A | 4/2000 | Sanchez |
| 6,142,698 A | 11/2000 | Nutter |
| 6,203,415 B1 | 3/2001 | Torrance-Castanza et al. |
| 6,328,643 B1 | 12/2001 | Chien et al. |
| 6,353,178 B1 | 3/2002 | Linhart |
| 6,392,150 B2 | 5/2002 | Linhart |
| 6,450,869 B1 | 9/2002 | Sherez |
| 6,468,141 B1 * | 10/2002 | Conboy ................. B24B 7/184 |
| | | 451/344 |
| 6,474,747 B2 | 11/2002 | Beaulieu et al. |
| 6,659,852 B1 | 12/2003 | Wettstein et al. |
| 6,676,329 B2 | 1/2004 | Mandon et al. |
| 6,722,904 B2 | 4/2004 | Linhart |
| 6,722,967 B1 | 4/2004 | Oddo et al. |
| 6,733,315 B2 | 5/2004 | Linhart |
| 6,743,086 B2 | 6/2004 | Nelson et al. |
| 6,758,731 B2 | 7/2004 | Dutterer et al. |
| 6,793,567 B1 | 9/2004 | Corkill et al. |
| 6,796,889 B2 | 9/2004 | Marton |
| 6,855,040 B2 | 2/2005 | Chien et al. |
| 6,860,799 B2 | 3/2005 | Loveless |
| 6,866,570 B2 | 3/2005 | Hunter, Jr. |
| 6,979,254 B1 | 12/2005 | Chien et al. |
| 6,991,529 B2 | 1/2006 | Annis et al. |
| 7,011,573 B2 | 3/2006 | McArthur et al. |
| 7,249,996 B1 | 7/2007 | Volyar |
| 7,264,541 B2 | 9/2007 | Ray et al. |
| 7,275,981 B1 | 10/2007 | Hurt et al. |
| 7,384,328 B2 | 6/2008 | Panfili |
| 7,416,477 B2 | 8/2008 | Henke et al. |
| 7,497,765 B2 | 3/2009 | Field et al. |
| 7,549,913 B2 | 6/2009 | Weiford et al. |
| 7,625,264 B1 | 12/2009 | Gordon |
| 7,740,524 B2 | 6/2010 | Ray, Jr. |
| 7,828,631 B1 | 11/2010 | Herbert |
| 7,854,649 B2 | 12/2010 | Bohne et al. |
| 7,883,116 B2 | 2/2011 | Canale |
| 7,914,167 B2 | 3/2011 | Petersen |
| 8,128,306 B2 | 3/2012 | Gorza |
| 8,133,094 B2 | 3/2012 | Anderson et al. |
| 8,137,165 B2 | 3/2012 | Loveless et al. |
| 8,523,637 B2 | 9/2013 | Loveless et al. |
| 8,591,292 B2 | 11/2013 | Roscher |
| 8,628,381 B2 | 1/2014 | Arvinte et al. |
| 8,702,478 B2 | 4/2014 | Loveless et al. |
| 8,801,506 B2 | 8/2014 | Chen |
| 8,851,784 B2 | 10/2014 | Donohue |
| 8,872,049 B2 | 10/2014 | Yuan |
| 9,387,566 B2 | 7/2016 | Roeck et al. |
| 9,393,658 B2 | 7/2016 | Walker et al. |
| 9,482,254 B2 | 11/2016 | Lai |
| 9,517,555 B2 | 12/2016 | Racov et al. |
| 9,651,073 B2 | 5/2017 | Bukovitz et al. |
| 9,770,821 B2 | 9/2017 | Racov et al. |
| 9,868,184 B2 | 1/2018 | Moss et al. |
| 9,954,418 B2 | 4/2018 | Kawakami et al. |
| 9,975,219 B2 | 5/2018 | Fontes Da Rocha Castro et al. |
| 9,981,360 B2 | 5/2018 | Roeck et al. |
| 10,027,201 B2 | 7/2018 | Hara et al. |
| 10,035,236 B2 | 7/2018 | Udo et al. |
| 10,051,930 B2 | 8/2018 | Heim |
| 11,084,142 B2 | 8/2021 | Walker et al. |
| 2002/0088091 A1 | 7/2002 | Grote |
| 2003/0001387 A1 | 1/2003 | Tawara et al. |
| 2003/0032381 A1 | 2/2003 | Ernest et al. |
| 2003/0129934 A1 | 7/2003 | Chein et al. |
| 2005/0287937 A1 | 12/2005 | Florio |
| 2006/0073778 A1 * | 4/2006 | Phillips .................. B24B 55/10 |
| | | 451/354 |
| 2008/0085664 A1 | 4/2008 | Long et al. |
| 2008/0146129 A1 | 6/2008 | Kouzuma et al. |
| 2008/0157520 A1 | 7/2008 | Ryhman |
| 2008/0176498 A1 | 7/2008 | Rossi et al. |
| 2008/0201877 A1 | 8/2008 | Sengewald et al. |
| 2009/0247059 A1 | 10/2009 | Kammerer |
| 2010/0075581 A1 | 3/2010 | Hill |
| 2010/0289255 A1 | 11/2010 | Cordes et al. |
| 2011/0183587 A1 | 7/2011 | Roscher |
| 2011/0236123 A1 | 9/2011 | Melino, Sr. et al. |
| 2011/0306278 A1 | 12/2011 | Ying |
| 2011/0312501 A1 | 12/2011 | Wilson |
| 2012/0322350 A1 | 12/2012 | Schywalsky |
| 2013/0137348 A1 | 5/2013 | Chen |
| 2014/0096796 A1 | 4/2014 | Frum |
| 2014/0215864 A1 | 8/2014 | Fischer, Jr. |
| 2015/0231575 A1 | 8/2015 | Roeck et al. |
| 2015/0251289 A1 | 9/2015 | Creighton |
| 2016/0213216 A1 | 7/2016 | Laessig |
| 2017/0100811 A1 | 4/2017 | Bernhardt |
| 2017/0251895 A1 | 9/2017 | Lutz et al. |
| 2017/0274520 A1 * | 9/2017 | Christophersen ........ H02K 9/10 |
| 2017/0334056 A1 | 11/2017 | Kawakami et al. |
| 2018/0117728 A1 | 5/2018 | Kawakami et al. |
| 2019/0039207 A1 | 2/2019 | Harder et al. |
| 2019/0091848 A1 * | 3/2019 | Walker ..................... B25F 5/00 |
| 2019/0105755 A1 | 4/2019 | Walker et al. |
| 2019/0160622 A1 | 5/2019 | Barth et al. |
| 2019/0232456 A1 * | 8/2019 | Sugita ..................... B24B 47/12 |
| 2019/0247972 A1 | 8/2019 | Kerestes |
| 2020/0072398 A1 | 3/2020 | Lin |
| 2021/0267336 A1 | 9/2021 | Kälin |
| 2023/0003242 A1 | 1/2023 | Chou et al. |

FOREIGN PATENT DOCUMENTS

| | | | |
|---|---|---|---|
| CN | 109227254 A * | 1/2019 | ............ B24B 47/12 |
| CN | 110103110 A | 8/2019 | |
| CN | 209304229 U | 8/2019 | |
| DE | 884163 C | 7/1953 | |
| DE | 1110043 B | 6/1961 | |
| DE | 2739982 A1 | 3/1979 | |
| DE | 3023691 C2 | 11/1989 | |
| DE | 2850120 C2 | 5/1992 | |
| DE | 3638952 C2 | 5/1993 | |
| DE | 9216257 U1 | 3/1994 | |
| DE | 9216257 U1 | 5/1994 | |
| DE | 29514330 U1 | 11/1995 | |
| DE | 4239559 C2 | 12/2000 | |
| DE | 20305233 U1 | 6/2003 | |
| DE | 10254275 A1 | 7/2003 | |
| DE | 10314800 B3 | 5/2004 | |
| DE | 10335301 B3 | 3/2005 | |
| DE | 202005008613 U1 | 8/2005 | |
| DE | 202005011659 U1 | 11/2005 | |
| DE | 10161452 B4 | 5/2008 | |
| DE | 202009004370 U1 | 7/2009 | |
| DE | 102008055797 A1 | 5/2010 | |
| DE | 102008063510 A1 | 6/2010 | |
| DE | 212010000084 U1 | 11/2012 | |
| DE | 202013105712 U1 | 3/2014 | |
| DE | 102012020151 B4 | 5/2014 | |
| DE | 102012111985 A1 | 6/2014 | |
| DE | 102012111987 A1 | 6/2014 | |
| DE | 102012111989 A1 | 6/2014 | |
| DE | 102012111990 A1 | 6/2014 | |
| DE | 102014001209 A1 | 7/2014 | |
| DE | 202014104588 U1 | 10/2014 | |
| DE | 102013213271 A1 | 1/2015 | |
| DE | 202013104617 U1 | 1/2015 | |
| DE | 102014103019 A1 | 9/2015 | |
| DE | 102014109583 A1 | 12/2015 | |
| DE | 102014213394 A1 | 1/2016 | |
| DE | 102014112355 A1 | 3/2016 | |
| DE | 102014113881 A1 | 3/2016 | |

(56) References Cited

FOREIGN PATENT DOCUMENTS

| | | | |
|---|---|---|---|
| DE | 102015207149 A1 | 10/2016 | |
| DE | 102015207151 A1 | 10/2016 | |
| DE | 102015112059 A1 | 1/2017 | |
| DE | 102015113190 A1 | 2/2017 | |
| DE | 102016118317 A1 | 4/2017 | |
| DE | 102016106556 A1 * | 10/2017 | ............ B24B 47/12 |
| DE | 102016106556 A1 | 10/2017 | |
| DE | 102016106557 A1 | 10/2017 | |
| DE | 102016106558 A1 | 10/2017 | |
| DE | 102016106559 A1 | 10/2017 | |
| DE | 102016106560 A1 | 10/2017 | |
| DE | 102016106561 A1 | 10/2017 | |
| DE | 102013020192 B4 | 3/2018 | |
| DE | 102013020427 B4 | 4/2018 | |
| DE | 102016124868 A1 | 7/2018 | |
| DE | 102018119234 A1 | 2/2019 | |
| EP | 0689902 A1 | 1/1996 | |
| EP | 0727281 A1 | 8/1996 | |
| EP | 0573916 B1 | 8/1997 | |
| EP | 0727281 B1 | 10/2001 | |
| EP | 1400318 A2 | 3/2004 | |
| EP | 1290972 B1 | 4/2004 | |
| EP | 1290973 B1 | 4/2004 | |
| EP | 1400318 A3 | 7/2004 | |
| EP | 1074341 B1 | 3/2005 | |
| EP | 1779968 A1 | 5/2007 | |
| EP | 1162032 B1 | 10/2007 | |
| EP | 1961518 A1 | 8/2008 | |
| EP | 2033738 A2 | 3/2009 | |
| EP | 1977858 B1 | 6/2009 | |
| EP | 1964644 B1 | 9/2009 | |
| EP | 2096330 A1 | 9/2009 | |
| EP | 2127808 A1 | 12/2009 | |
| EP | 2196291 A2 | 6/2010 | |
| EP | 2202029 A2 | 6/2010 | |
| EP | 2272633 A2 | 1/2011 | |
| EP | 2311606 A2 | 4/2011 | |
| EP | 2196284 B1 | 1/2012 | |
| EP | 1793966 B1 | 2/2012 | |
| EP | 2202029 B1 | 2/2012 | |
| EP | 2033738 B1 | 7/2012 | |
| EP | 1702715 B1 | 11/2012 | |
| EP | 1719581 B1 | 3/2013 | |
| EP | 2712705 A2 | 4/2014 | |
| EP | 2272633 B1 | 9/2014 | |
| EP | 2884515 A1 | 6/2015 | |
| EP | 2311606 B1 | 7/2015 | |
| EP | 2285535 B1 | 10/2015 | |
| EP | 2928640 A1 | 10/2015 | |
| EP | 2933063 A1 | 10/2015 | |
| EP | 2954977 A1 | 12/2015 | |
| EP | 2955435 A1 | 12/2015 | |
| EP | 2207191 B1 | 3/2016 | |
| EP | 3000559 A2 | 3/2016 | |
| EP | 3042738 A2 | 7/2016 | |
| EP | 2349642 B1 | 8/2016 | |
| EP | 2607016 B1 | 8/2016 | |
| EP | 2089185 B1 | 10/2016 | |
| EP | 3132891 A2 | 2/2017 | |
| EP | 3132892 A2 | 2/2017 | |
| EP | 3165335 A1 | 5/2017 | |
| EP | 3166213 A2 | 5/2017 | |
| EP | 2599374 B1 | 6/2017 | |
| EP | 3000562 B1 | 6/2017 | |
| EP | 2465646 B1 | 9/2017 | |
| EP | 3217412 A1 | 9/2017 | |
| EP | 3083139 B1 | 10/2017 | |
| EP | 3246127 A1 | 11/2017 | |
| EP | 2712705 B1 | 1/2018 | |
| EP | 3000559 A1 | 9/2018 | |
| EP | 3000559 B1 | 9/2018 | |
| EP | 3409174 A1 | 12/2018 | |
| EP | 2928643 B1 | 5/2019 | |
| EP | 2928645 B1 | 5/2019 | |
| EP | 3416779 B1 | 10/2019 | |
| JP | 2001173618 A | 6/2001 | |
| JP | 5323624 B2 | 10/2013 | |
| JP | 2013212209 A | 10/2013 | |
| JP | 2019130643 A | 8/2019 | |
| WO | 1990001786 A1 | 2/1990 | |
| WO | 1998029022 A1 | 7/1998 | |
| WO | 1999003392 A1 | 1/1999 | |
| WO | 2007089936 A2 | 8/2007 | |
| WO | 2008033377 A2 | 3/2008 | |
| WO | 2008037021 A1 | 4/2008 | |
| WO | 2007089936 A3 | 6/2008 | |
| WO | 2010051964 A1 | 5/2010 | |
| WO | 2014086829 A1 | 6/2014 | |
| WO | 2014086866 A1 | 6/2014 | |
| WO | 2014086873 A1 | 6/2014 | |
| WO | 2014086876 A1 | 6/2014 | |
| WO | 2014127669 A1 | 8/2014 | |
| WO | 2015000927 A1 | 1/2015 | |
| WO | 2015025677 A1 | 2/2015 | |
| WO | 2015091066 A1 | 6/2015 | |
| WO | 2017059701 A1 | 4/2017 | |
| WO | 2017140657 A1 | 8/2017 | |
| WO | 2017178409 A1 | 10/2017 | |
| WO | 2017178410 A1 | 10/2017 | |
| WO | 2019145559 A1 | 8/2019 | |

OTHER PUBLICATIONS

Merriam-Webster Integral Definition (Year: 2023).*
EP EESR dated Mar. 17, 2021, in corresponding EP application No. 20200107.9.
EP EESR dated Mar. 17, 2021, in corresponding EP application No. 20200117.8.
EP EESR dated Mar. 29, 2021, in corresponding EP application No. 20200132.7.
EP EESR dated Mar. 19, 2021, in corresponding EP application No. 20200121.0.
EP EESR dated Apr. 1, 2021, in corresponding EP application No. 20200124.4.
GB SR dated Mar. 10, 2021, in corresponding GB application No. 2001235.7.
EP EESR dated Jun. 11, 2021, in corresponding EP application No. 20200127.7.
EP EESR dated Jul. 26, 2021, in corresponding EP application No. 21150164.8.
EP EESR dated Aug. 25, 2022, in corresponding EP application No. 22166274.5.
European Search Report dated Nov. 10, 2023 in corresponding EP application No. 23181651.3, 10 pages.

* cited by examiner

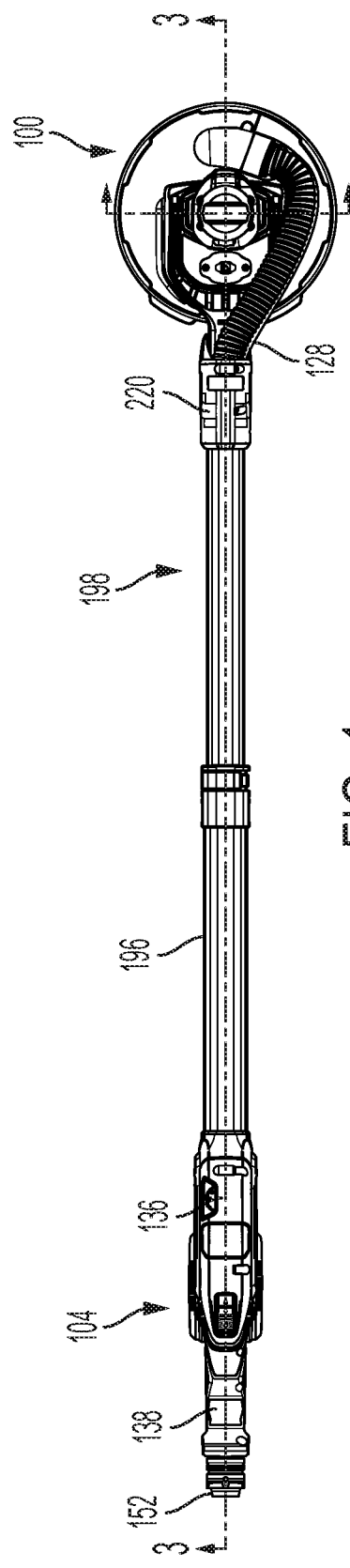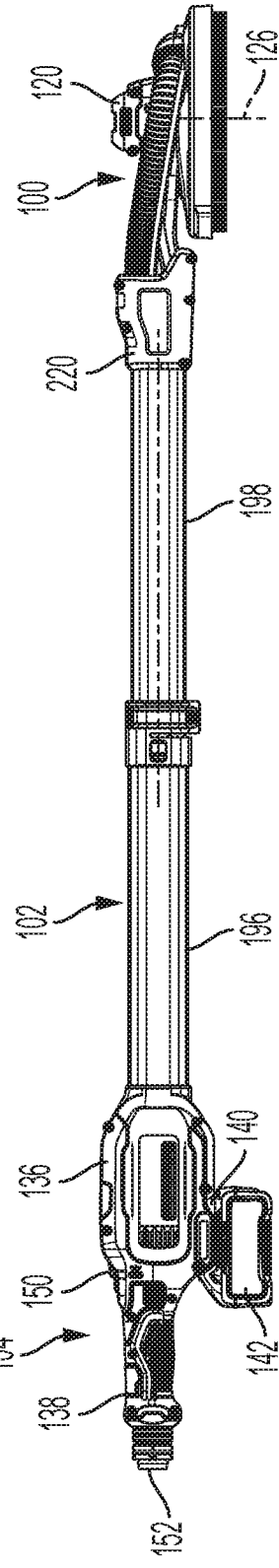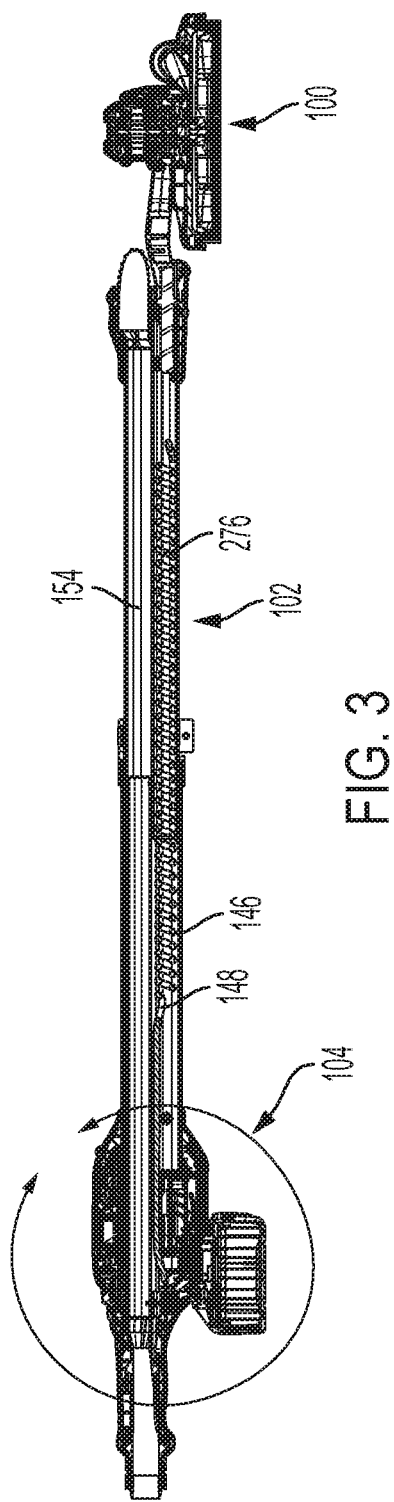

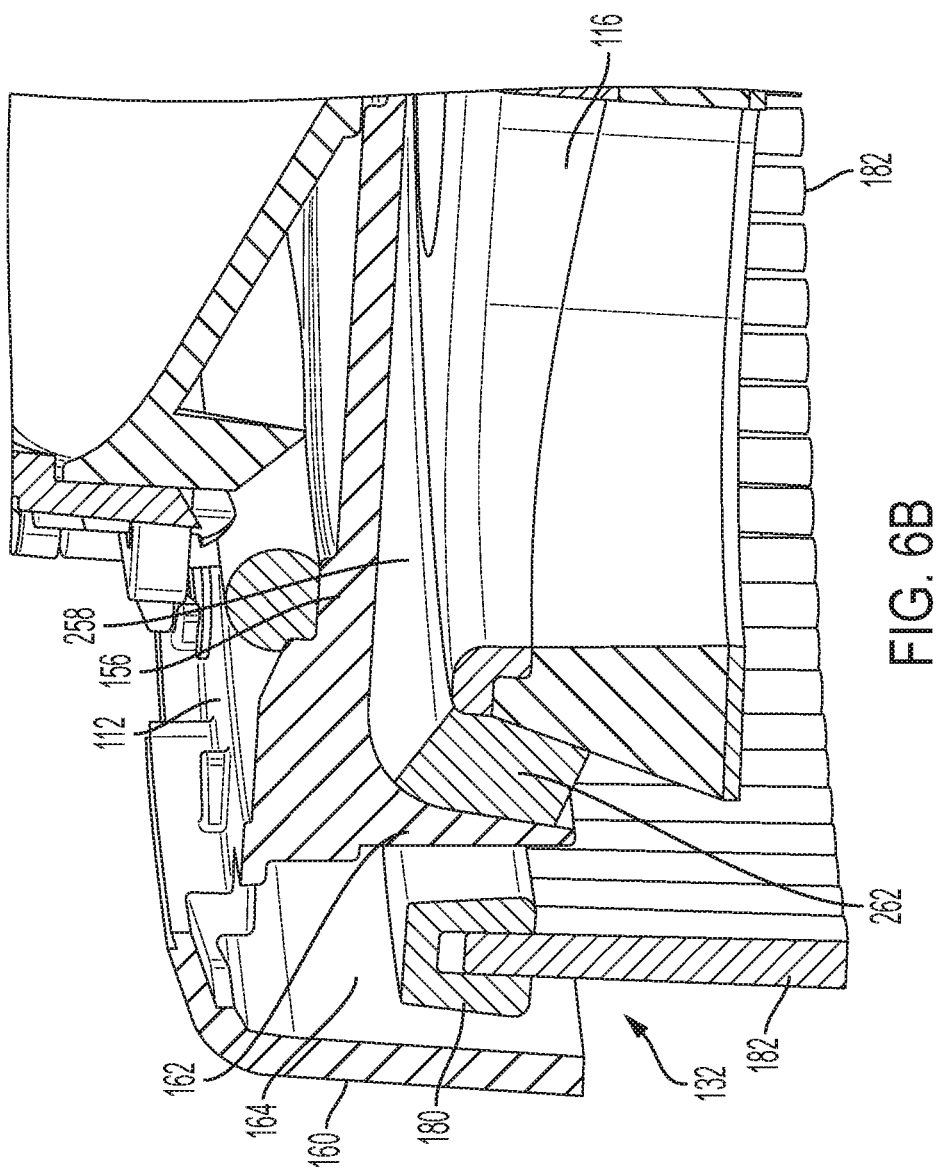

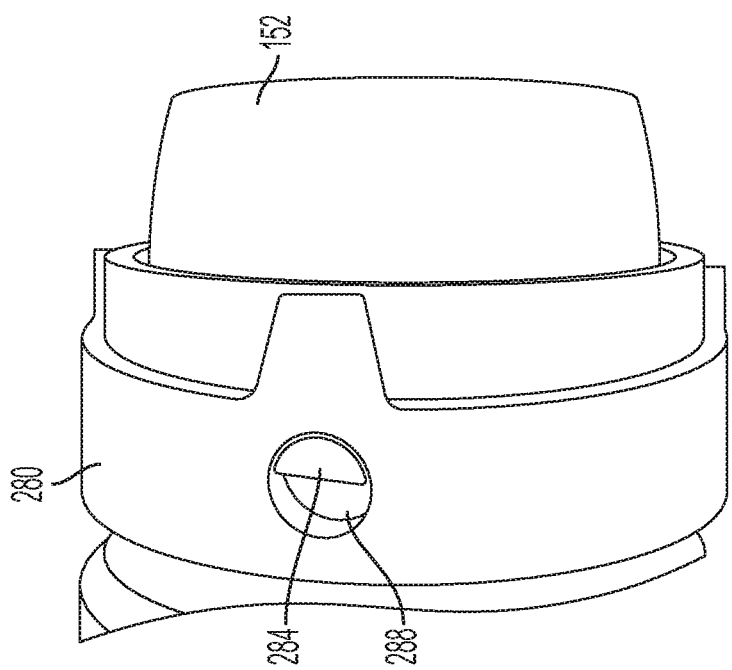

POLE SANDER

CROSS-REFERENCE TO RELATED APPLICATIONS

This application claims priority, under 35 U.S.C. § 119, to UK Patent Application No. 1915324.6 filed Oct. 23, 2019, and UK Patent Application No. 1919406.7 filed Dec. 23, 2019.

FIELD

The present invention relates to a pole sander.

BACKGROUND

Pole sanders typically comprise a telescopic pole with a sanding head pivotally mounted on one end. The sanding head comprises a hood which surrounds a platen which is mounted on an output spindle which projects from the hood. Sandpaper can be attached to the platen for sanding a work surface. Alternatively, a polishing pad can be attached to polish a work surface. The output spindle and hence the platen, is rotated by an electric motor. The electric motor can be mounted on the sanding head. Alternatively, the motor can be mounted on the end of the telescopic pole remote from the sanding head. A vacuum cleaner can be attached to the sanding head, typically via a pipe which extends through the telescopic pole, to remove dust generated by the sanding action of the rotating platen from under the hood.

Examples of pole sanders are disclosed in EP0727281, EP2033738, DE102014103019, WO2014/086873, EP3083139 and DE102014112355.

Often, the electric motors are brushless electric motors, such as a DC brushless motor, which are driven by the control electronics. A problem encountered with the use of such motors is how to remove the heat generated by the control electronics from the control electronics when the control electronics are driving the electric motor to maintain the temperature of the control electronics within a working range.

Poles sanders can perform different surface treatments such as sanding, polishing, grinding or rubbing work surfaces.

SUMMARY

According to an embodiment, a handheld pole sander is provided including an elongate body having two ends; an electric motor electrically controlled by control electronics; and a sanding head attached via a pivot mechanism to a first end of the elongate body. The sanding head includes a hood and an output spindle projecting from the hood and rotatably driven by the electric motor. At least part of the elongate body comprises a heat conductive part is at least partially made of heat conductive material, and the control electronics are mounted on the elongate body adjacent to or in direct contact with the heat conductive part of the elongate body.

In an embodiment, the heat conductive part of the elongate body is made, at least in part, from metal.

In an embodiment, the heat conductive part of the elongate body is made at least in part from aluminium tubing.

In an embodiment, a rear housing is mounted on a second end of the elongate body. In an embodiment, the second end of the elongate body includes heat conductive material and the control electronics are mounted inside the rear housing adjacent to or in direct contact with the heat conductive material of the second end of the elongate body.

In an embodiment, the elongate body includes, at least in part, a first tube and a second tube mounted in parallel to the first tube inside of the first tube. In an embodiment, the control electronics are mounted inside of the first tube adjacent to or in direct contact with the second tube.

In an embodiment, first tube includes a cut-out region and the control electronics are mounted inside the cut-out region.

In an embodiment, the second tube forms a first passageway used to transport air through the length of the elongate body.

In an embodiment, a second passageway is formed between the first tube and the second tube, the second passageway forming a conduit through the elongate body.

In an embodiment, the electric motor is mounted on the hood and an electric cable passes through the conduit that connects between the control electronics and the electric motor.

In an embodiment, the electric motor is connected to the control electronics via a single continuous electric cable.

In an embodiment, the control electronics are mounted in a control module having a housing, the housing being constructed from heat conductive material.

In an embodiment, the housing of the control electronics is mounted on the elongate body adjacent to or in direct contact with the heat conductive part of the elongate body.

In an embodiment, the housing of the control electronics is formed integrally with the part of the elongate body made from heat conductive material.

In an embodiment, the electric motor drives the output spindle via a gear transmission.

In an embodiment, the gear transmission comprises a planetary gear system.

BRIEF DESCRIPTION OF THE DRAWINGS

The drawings described herein are for illustrative purposes only of selected embodiments and not all possible implementations and are not intended to limit the scope of the present disclosure.

FIG. 1 shows a top view of the pole sander;

FIG. 2 shows a side view of the pole sander;

FIG. 3 shows a vertical cross-sectional view of the pole sander;

FIG. 6B is the same as FIG. 6A with the addition of hatching to show cross sectional area of gap between edge of the platen and the inner wall;

FIG. 25 shows the rear end of the extension tube with the vacuum nozzle attached;

Corresponding reference numerals indicate corresponding parts throughout the several views of the drawings.

DETAILED DESCRIPTION

Figure 4:
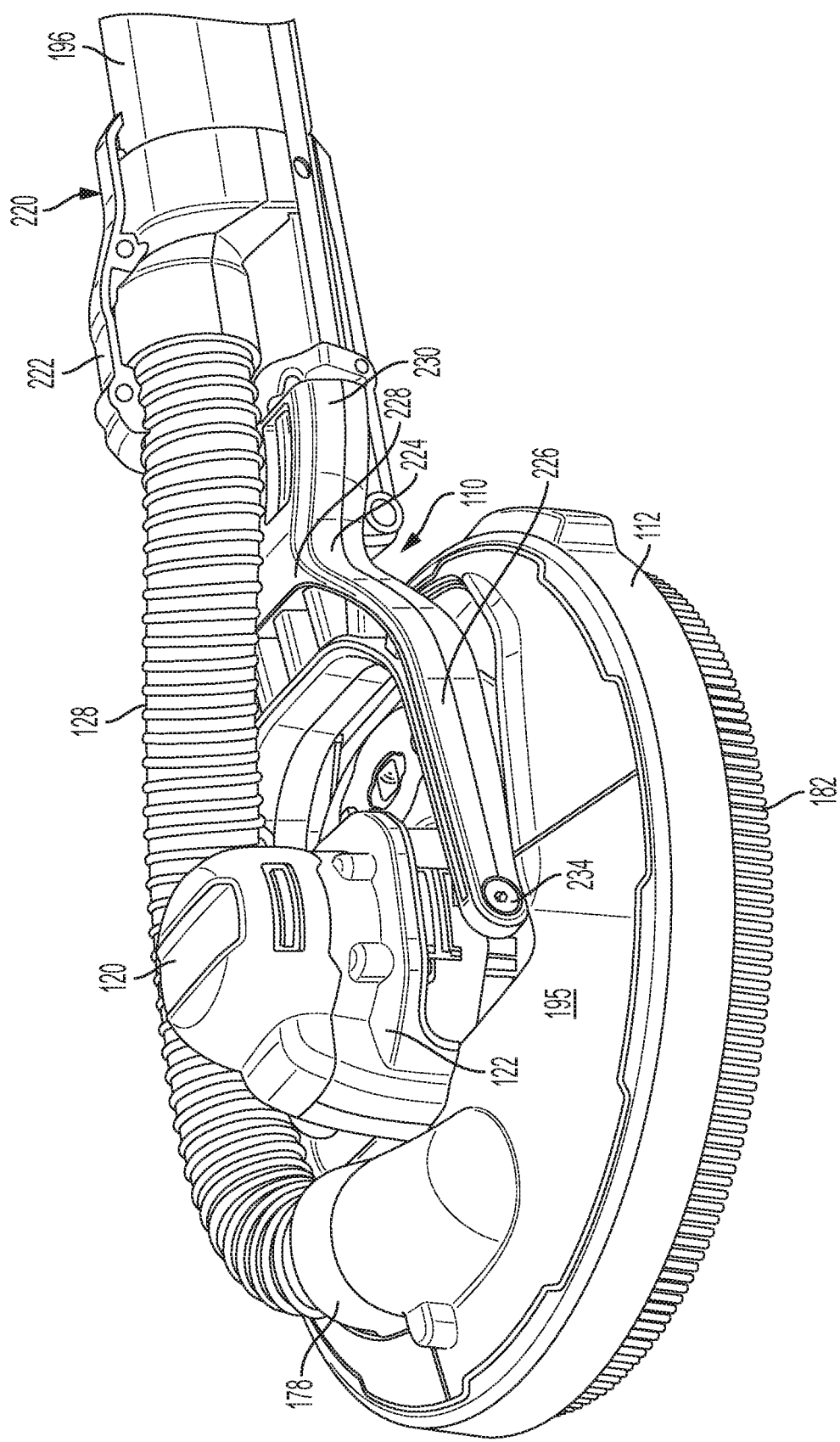
FIG. 4 shows a perspective view of the sanding head.

Referring to FIGS. 1 to 3, the pole sander comprises a sanding head 100 pivotally attached to one end of an elongate body 102 and a rear housing 104 attached to the other end.

The elongate body 102 is telescopic and is formed from two poles 196, 198, one of which slides in an out of the other as described in more detail below.

The sanding head 100 connects to the end of the elongate body 102 via a pivot mechanism 110 which is described in more detail below. The sanding head 100 comprises a hood 112 on top of which is mounted an electric motor 114. The motor 114 is a DC brushless motor 114. The motor 114 is enclosed by a motor housing 120 which is cup shaped and surrounds the top and sides of the motor 114. The motor housing 120 attaches to the top of a gear housing 122 which encloses a planetary gear set 124. The gear housing 122 mounts on top of the hood 112. The motor 114 is drivingly connected via the planetary gear set 124 to an output spindle 118 having a longitudinal axis 126 about which the output spindle 118 rotates and which is located below the hood 112. Attached to the end of output spindle 118 is a circular platen 116 which extends radially outwards from the output spindle 118. When the motor 114 is activated, the motor 114 rotationally drives the output spindle 118 and hence the platen 116 about a drive axis 126.

A flexible dust extraction pipe 128 attaches to the top of the hood 112 on one side of the motor 114. An aperture 130 is formed through the hood 112. The end of the flexible pipe 128 surrounds the aperture 130. As such air can be drawn from beneath hood 112 through the aperture 130 and into the flexible pipe 128. This enables dust and debris generated during the operation of the pole sander to be removed from under the hood 112 by applying a suction force to the flexible pipe 128. The operation of the dust extraction of the pole sander is described in more detail below.

A brush ring 132 attaches to the edge of the hood 112. The brush ring 132 is described in more detail below.

The rear housing 104 is formed two plastic clam shells 134 which clamp to the end of the elongate body 102. The rear housing 104 comprises a forward mount section 136 and rear handle section 138. A battery mount 140 is formed on the lower surface of the mount section of the rear housing 104. A battery pack 142 can be slid in a forward direction (Arrow M in FIG. 19) onto the battery mount 140 to attach it to the rear housing 104 and in a rearward direction to detach it from the battery mount 140. The design of the battery mount 140 and battery 142 are known in art and therefore will not be described in any more detail.

Control electronics 144 for the motor 114 are mounted inside of forward mount 136 section of the rear housing 104. The control electronics 144 are connected to the motor 114 via an electric cable 146 which passes through a second passageway 148 of the elongate body 102 through the length of the elongate body 102. The control electronics 144 control the operation of the brushless motor 114.

A lock on/lock off switch 150 is mounted on the top of rear housing 104 where the rear handle section 138 connects to the forward mount section 136. An operator can use the lock on/lock off switch 150 to activate the motor 114.

An operator can support the pole sander by grasping the rear handle section 138 of the rear housing 104 in one hand and the elongate body 102 in the other. The operator can switch the pole sander on or off using the thumb of the hand grasping the rear handle section 138.

A vacuum connection nozzle 152 is mounted on the rear of the rear housing 104 which connects to a first passageway 154 which extends through the length of the elongate body 102. The other end of the second passage 154 connects to the flexible pipe 128. A vacuum cleaner (not shown) can be connected to the nozzle 152 and draw air from under the hood 112, through the flexible pipe 128, through the first passage 154 in the elongate body 102, through the nozzle 152 and into a vacuum cleaner.

The hood 112 will now be described with reference to FIGS. 4 to 6.

The hood 112 comprises a circular plate 156 which extends radially from a central circular hole 158 through which the output spindle 118 projects. Formed on the underside of the plate 156 around the edge is a peripheral wall 160 which projects perpendicularly to the plane of the circular plate 156. An inner circular inner wall 162 is formed on the underside of the plate 156 in close proximity to and concentrically with the peripheral wall 160. The inner wall 162 has the same height as the peripheral wall 160 and extends in the same direction that is parallel to the peripheral wall 160. A circular trough 164 is formed between the two walls 160, 162. Six rectangular apertures 166 are formed through the base of the trough 164. The apertures 166 are located equidistantly around the centre of the plate 156 in a symmetrical fashion. A chamber 166 is formed between the inner wall 162 and the underside of the plate 156.

Formed through the plate 156 between the inner wall 162 and the central hole is an arc shaped aperture 130 which allows air and debris to pass through the plate 156. The aperture 130 has three edges, a first straight edge 170 which extends tangentially to the longitudinal axis 126 of the output spindle 118, a second edge 172 of equal length which extends from the end of the first edge 170, perpendicularly to the first edge 170, in a direction away from the longitudinal axis 126 of the output spindle 118, and a third curved edge 174 extending between the ends of the first and second edges 170, 172. The circular plate 156 has a radius R. The whole of the arc shaped aperture 130 is located at a distance of less than half of the radius from longitudinal axis 126 of the output spindle 118 or the centre of the plate 156 (<R/2).

Integrally formed on the top side of the plate 156 is a curved wall 178 which forms a tubular passageway 176 from the arc shaped aperture 168 to an opening where the flexible pipe 128 is attached. Where the tubular passageway 176 connects to the arc shaped aperture 130, it is shaped to engage with the arc shaped aperture 130 at certain angles to maximise the air flow efficiency.

Figure 26A:
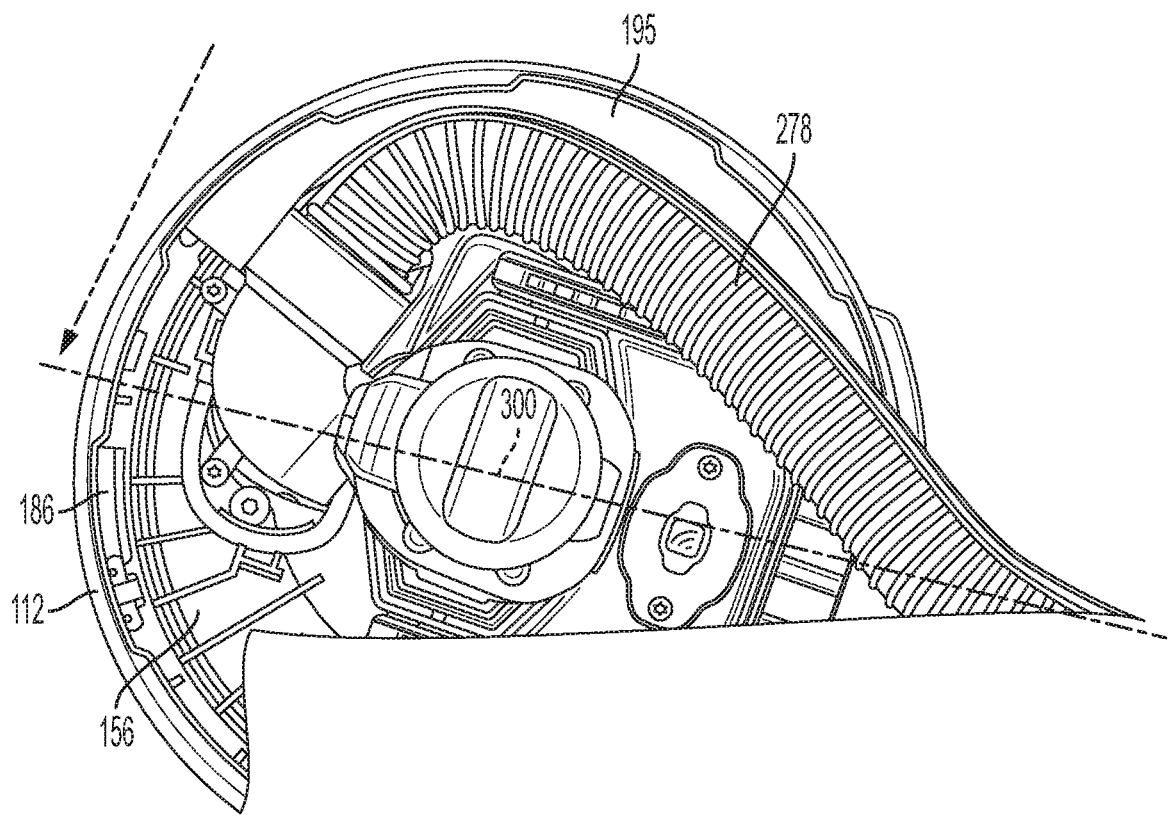
FIG. 26A and FIG. 26B show a first angle of the tubular passageway of the hood; and FIG. 27A
Figure 26B:
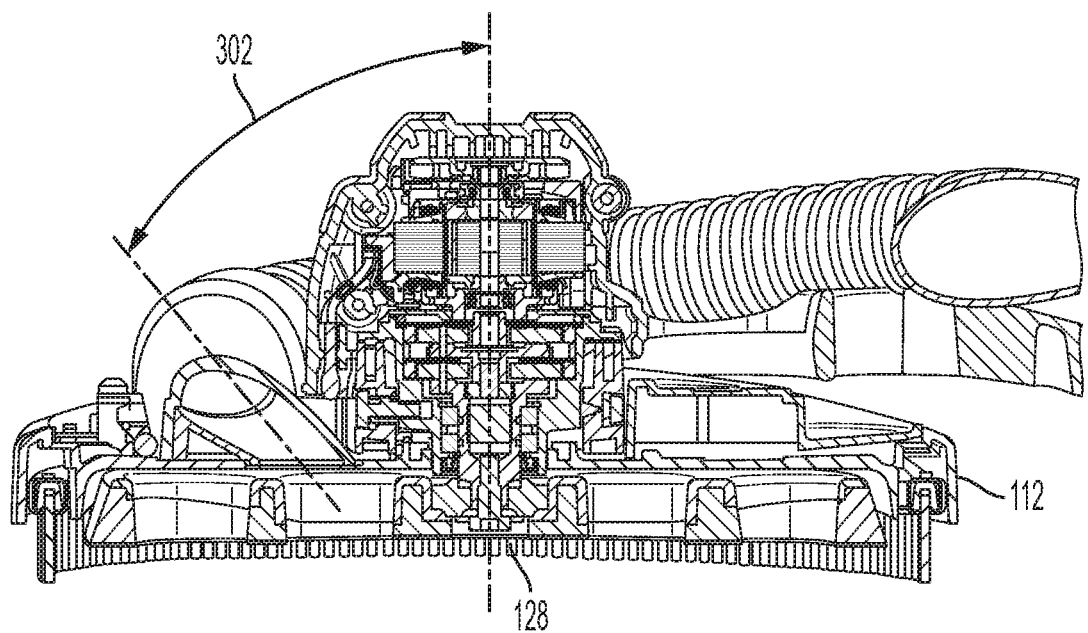

Referring to FIGS. 26A and 26B, the first angle of the exit of the tubular passageway 176 is located in a vertical plane 300 which passes through axis of rotation 126 of the output spindle 118 across the end of the tubular passage 176 adjacent the arc shaped aperture 168. The angle 302 in this plane 300 between the axis of rotation 126 of the output spindle 128 and the direction of the tubular passageway 176 is less than 90 degrees (perpendicular) but greater than 0 degrees (parallel) and is ideally between 20 degrees and 60 degrees.

Figure 27A:
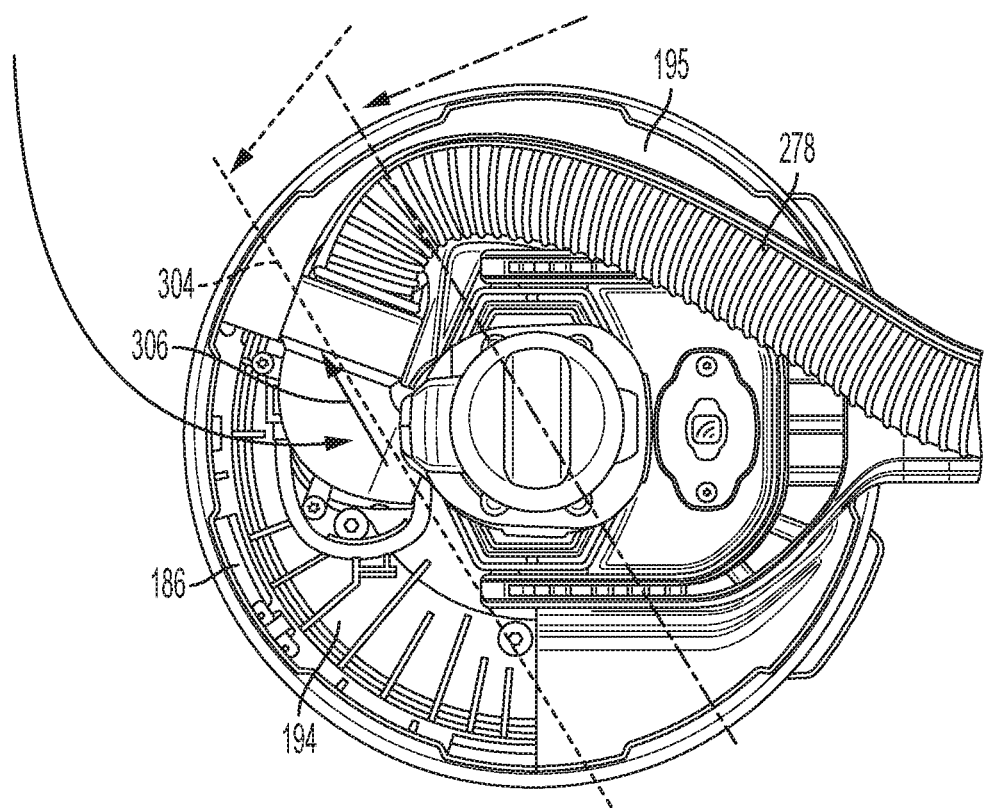
FIG. 27B shows a second angle of the tubular passageway.
Figure 27B:
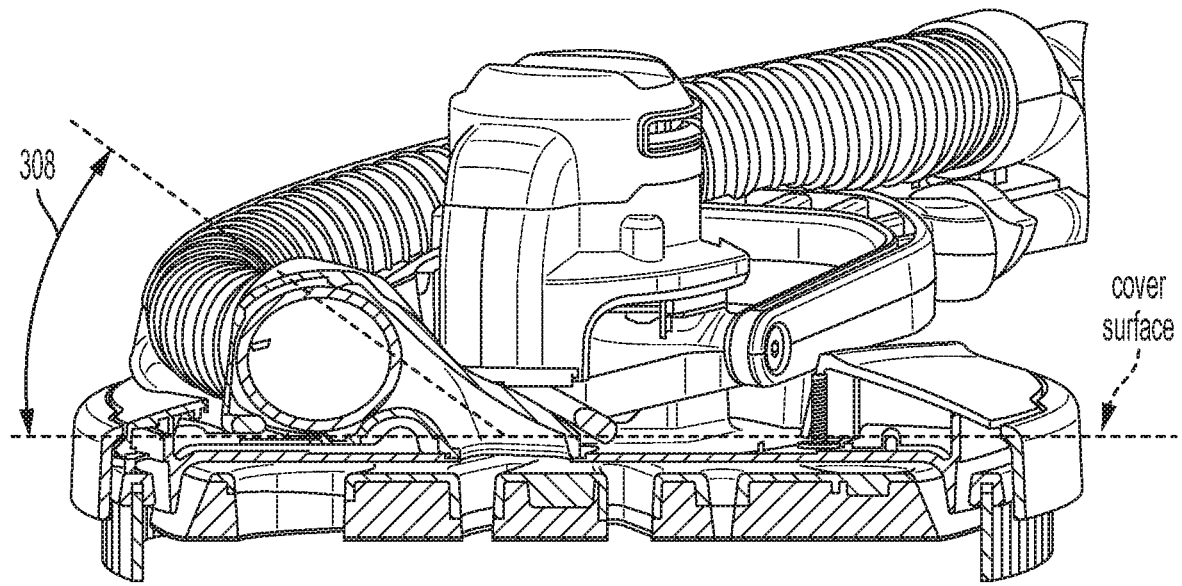

Referring to FIGS. 27A and 27B, the second angle of the exit of the tubular passageway 176 is located in a vertical plane 304 which extends tangentially to the axis of rotation 126 of the output spindle 128, the part of the plane 304 which passes through the exit of the tubular passageway 176 being the closest part to the axis of rotation 126 of the output spindle 118. The angle 308 in this plane 304 between the plane of the circular plate 156 of the hood 112 and the direction of the tubular passage 176 in the turning direction 306 of the platen 116 is less than 90 degrees and is ideally between 20 degrees and 60 degrees.

The hood 112 is formed in a one-piece construction from plastic.

The brush ring 132 will now be described with reference to 6 to 8.

Figure 8:
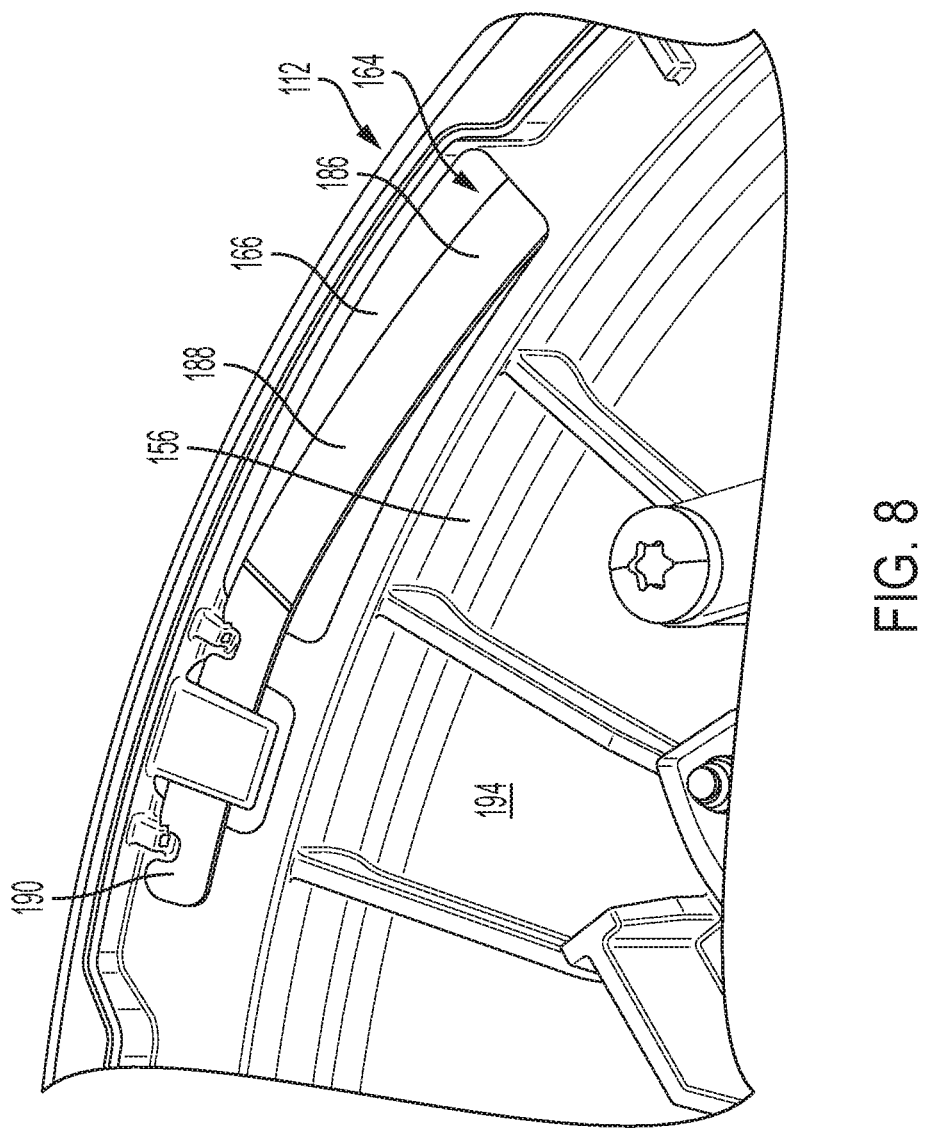
FIG. 8 shows a view of part of the top side of the plate with the leaf spring of the brush ring 132 passing through an aperture from below the plate to attach to the top side of the plate.
Figure 9:
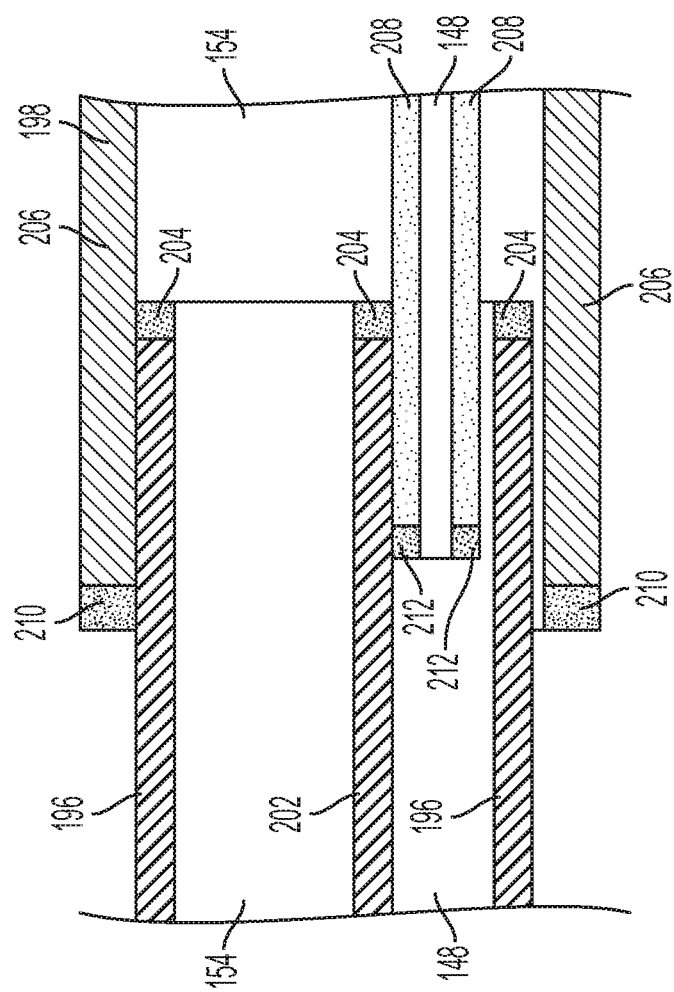
FIG. 9 shows a schematic diagram showing how the two poles of the elongate body are telescopically connected to each other.
Figure 10:
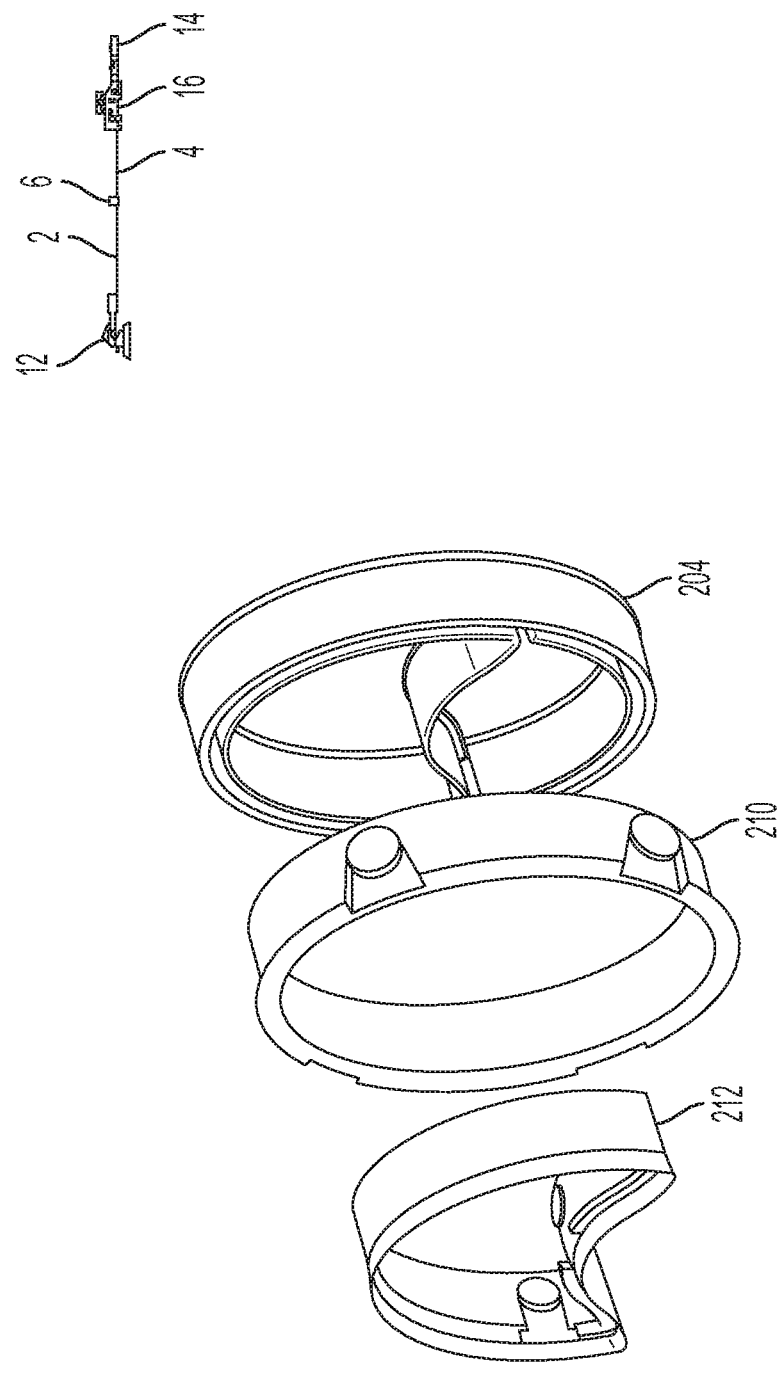
FIG. 10 shows the seals which connect between the two poles of the elongate body.
Figure 11C:
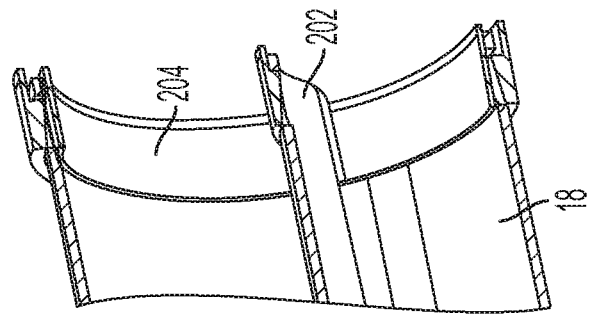
FIG. 11C shows the seal for the first pole 196 mounted on the first pole 196.
Figure 11B:
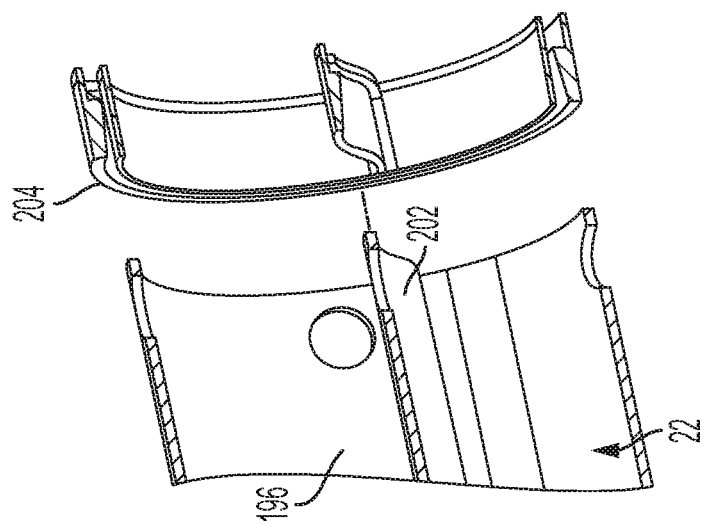
FIG. 11B shows a vertical cross section of the seal for the first pole 196 being attached to the first pole 196.
Figure 11A:
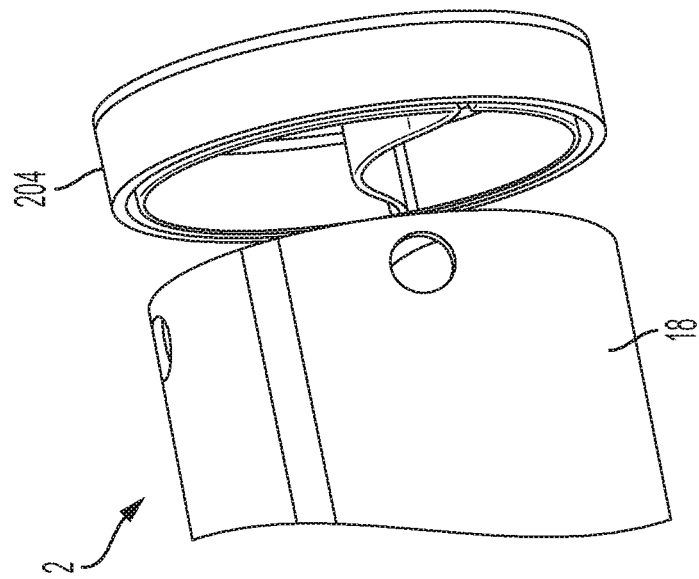
FIG. 11A shows the seal for the first pole 196 being attached to the first pole 196.
Figure 12:
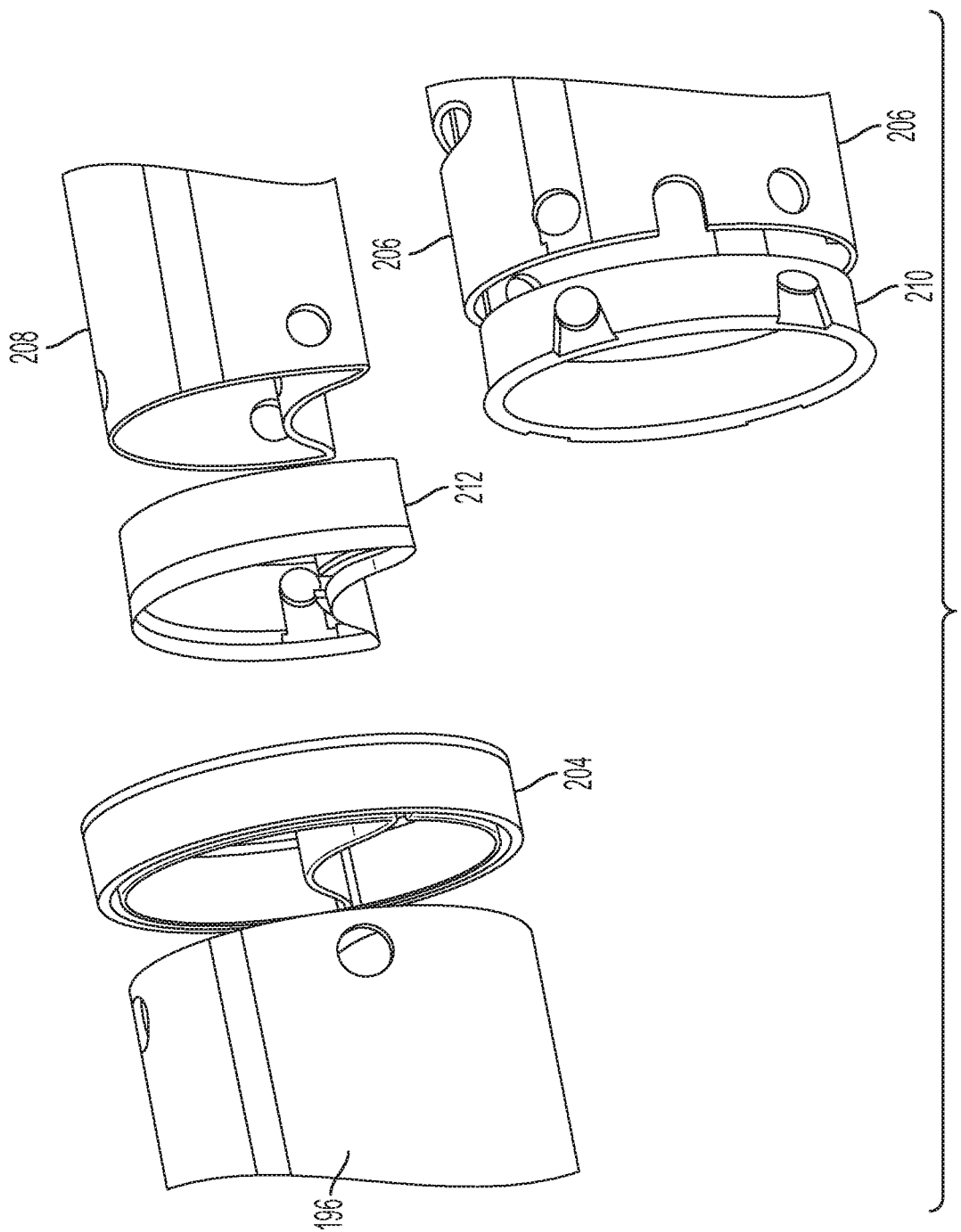
FIG. 12 shows the seals adjacent the ends of the aluminium tubes of the poles.
Figure 14:
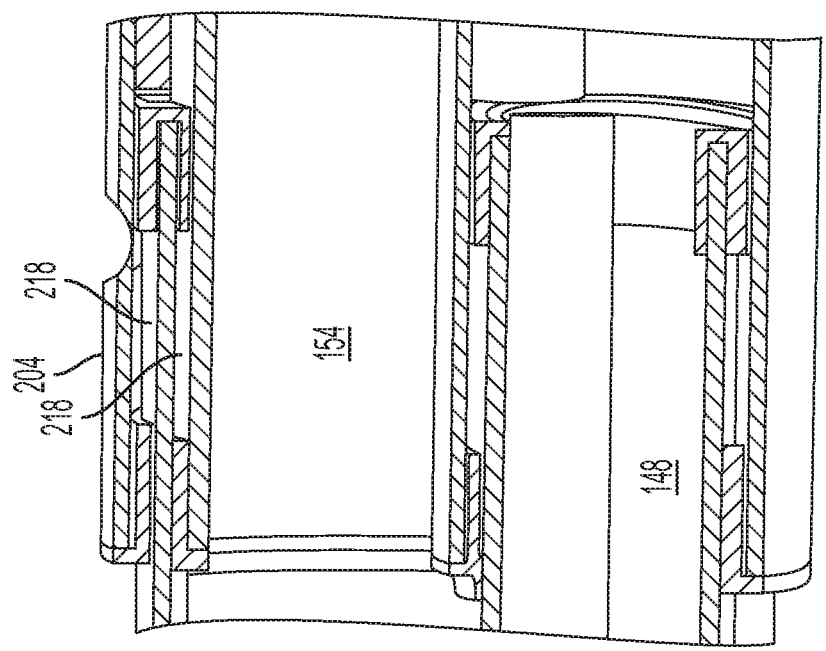
FIG. 14 shows a perspective cross section showing how the aluminium tubes and seals of the two poles of the elongate body are telescopically connected to each other.
Figure 13:
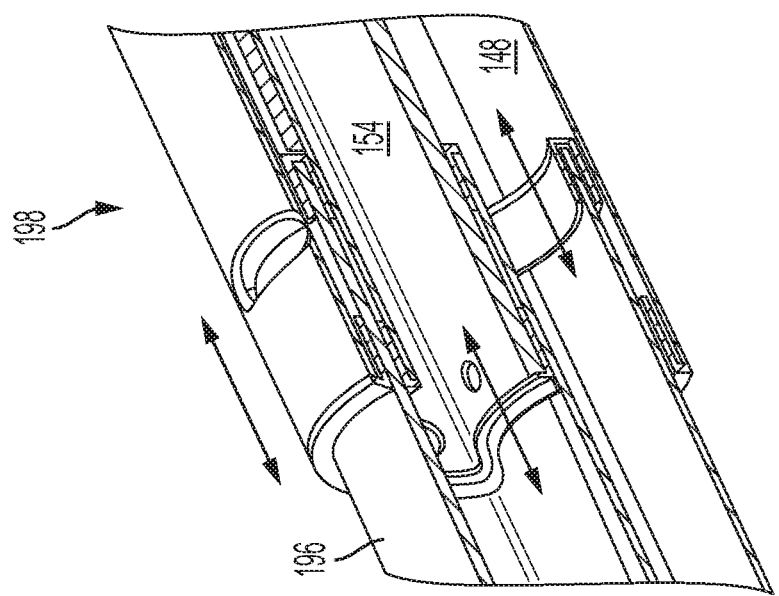
FIG. 13 shows a perspective cross section showing how the aluminium tubes and seals of the two poles of the elongate body are telescopically connected to each other.

The brush ring 132 comprises a plastic circular ring 180 which is sized so that it is capable of locating inside of the trough 164. Extending perpendicularly from the bottom side of the ring 180 are a series of bristles 182. Attached to the opposite top side of the brush ring 132 are the ends 184 of six leaf springs 186. The leaf springs 186 are formed from sheet metal and are resiliently deformable in a direction perpendicular to the plane of the sheet. The leaf springs 186 comprises a central section 188 located between two end sections 184, 190. The end sections 184, 190 extend in a direction parallel to the top surface of the ring 180. The central section 188 of the leaf springs 186 extends upwardly at a slight angle to the plane of the circular ring 180. Each central section 188 of each leaf spring 186 extends through the rectangular aperture 166 in the trough 164 and attaches to the top side 194 of the plate 156 as shown in FIG. 8. The leaf springs 186 bias the ring 180 to a position where it is located at a distance from the base of the trough 164 as shown in FIG. 6. In this position, the bristles 182 project below the hood 112. When the sanding head 100 is placed against a work surface, the bristles 182 engage with the work surface. When the sanding head 100 is pushed against the work surface, the brush ring 132 is pushed into the trough 164 against the biasing force of the leaf springs 186. The leaf springs 186 ensure that the bristles 182 are biased into engagement with the work surface. When the sanding head 100 is removed from the surface, the brush ring 132 returns to its original position due to the resilient nature of the leaf springs 186.

A plastic cover 195 is located over the topside of the hood 112 enclosing the ends 190 of the leaf springs 186 attached to the top side 194.

The telescopic elongate body 102 will now be described with reference to FIGS. 1 to 3 and 9 to 14.

The pole sander has an elongate body 102 comprising a first pole 196 which is capable of sliding in and out of a second pole 198 in a telescopic manner to enable the length of the pole sander to be adjusted. A locking mechanism 200 is used to lock the first pole 196 to the second pole 198 when the two poles 196, 198 have been telescoped to a preferred length.

Inside both of the poles 196, 198 are two passageways 148, 154 which run the length of the both poles 196, 198. The first larger passageway 154 is used to transport air (due to suction) and entrained dust and debris, generated during the use of the pole sander, through the poles 196, 198 from the working end to a vacuum nozzle 152 at the opposite end, the nozzle 152 being connected to a vacuum cleaner. The second smaller passageway 148 is used as a conduit for electric cable 146 which provide power and control signals from a control electronics 144 for the electric motor 114 mounted in the sanding head 100.

The first pole 196 comprises a single aluminium tube with an internal wall 202 located inside of the tube, which runs the length of the tube to form the two passageways 148, 154 which run the length of the first pole 196. The first larger passageway 154 forms part of the first passageway which is used to transport air. The second smaller passageway 148 forms part of the passageway which is used as a conduit for the electric cable 146. A first seal 204 attaches to the end of the first pole 196 which is inserted into the second pole 198. The shape of the seal 204 corresponds to that of the end of the aluminium tube and internal wall 202. The first seal 204 provides a seal between the first pole 196 and the second pole 198. It also acts as a slide bearing.

The second pole 198 comprises two aluminium tubes 206, 208. The second aluminium tube 208 locates inside of the first aluminium tube 206 and runs the full length of the first tube 206, their longitudinal axes being parallel to each other. The second aluminium tube 208 forms part of the first passageway which is used to transport air and dust or debris. The first aluminium tube 206 forms part of the passageway 154 which is used as a conduit. A second seal 210 is attached to the end of the first aluminium tube 206 into which the first pole 196 is inserted. The shape of the second seal 210 corresponds to that of the end of the aluminium tube 206. A third seal 212 is attached to the end of the second aluminium tube 208 which is inserted into the second passage 148 way of the first pole 196. The shape of the third seal 212 corresponds to that of the end of the second aluminium tube 208. The seals 210, 212 provides a seal between the first pole 196 and the second pole 198. They also act as slide bearings. The two tubes 206, 208 are connected to each other at their ends remote from the seals 210, 212 so that relative movement between the two tubes 206, 208 is prevented.

The poles 196, 198 are assembled as following. The end with the third seal 212 of the second aluminium tube 208 of the second pole 198 is inserted into the second passageway 148 of the first pole 196 through the seal 212. The end of the first pole 196 with the first seal 204, with the second aluminium tube 208 inside of it, is then inserted into the end of the first aluminium tube 206 of the second pole 198 with the second seal 212.

The larger passageway 154 in the first pole 196 connects directly to an end of the flexible tube via a collar 214. The larger passageway 154 in the second pole 198 connects to an end of the vacuum attachment nozzle 152 via an extension tube 216.

As the poles 196, 198 are made from aluminium, they are conductive. As such the poles, 196, 198 are electrically grounded by being electrically connected to neutral in the electronic control electronics 144 in the rear housing 104. in order to ensure that the whole of elongate body 102 is grounded, ideally, the seals 204, 210, 212 are manufactured from electrically conductive material. This ensures a good electrical connection between the two poles 196, 198.

In addition or as an alternative, metal contacts 218 such as leaf springs can be located between the telescopic poles 196, 198 to ensure electrical conductivity between the poles 196, 198.

Figure 15:
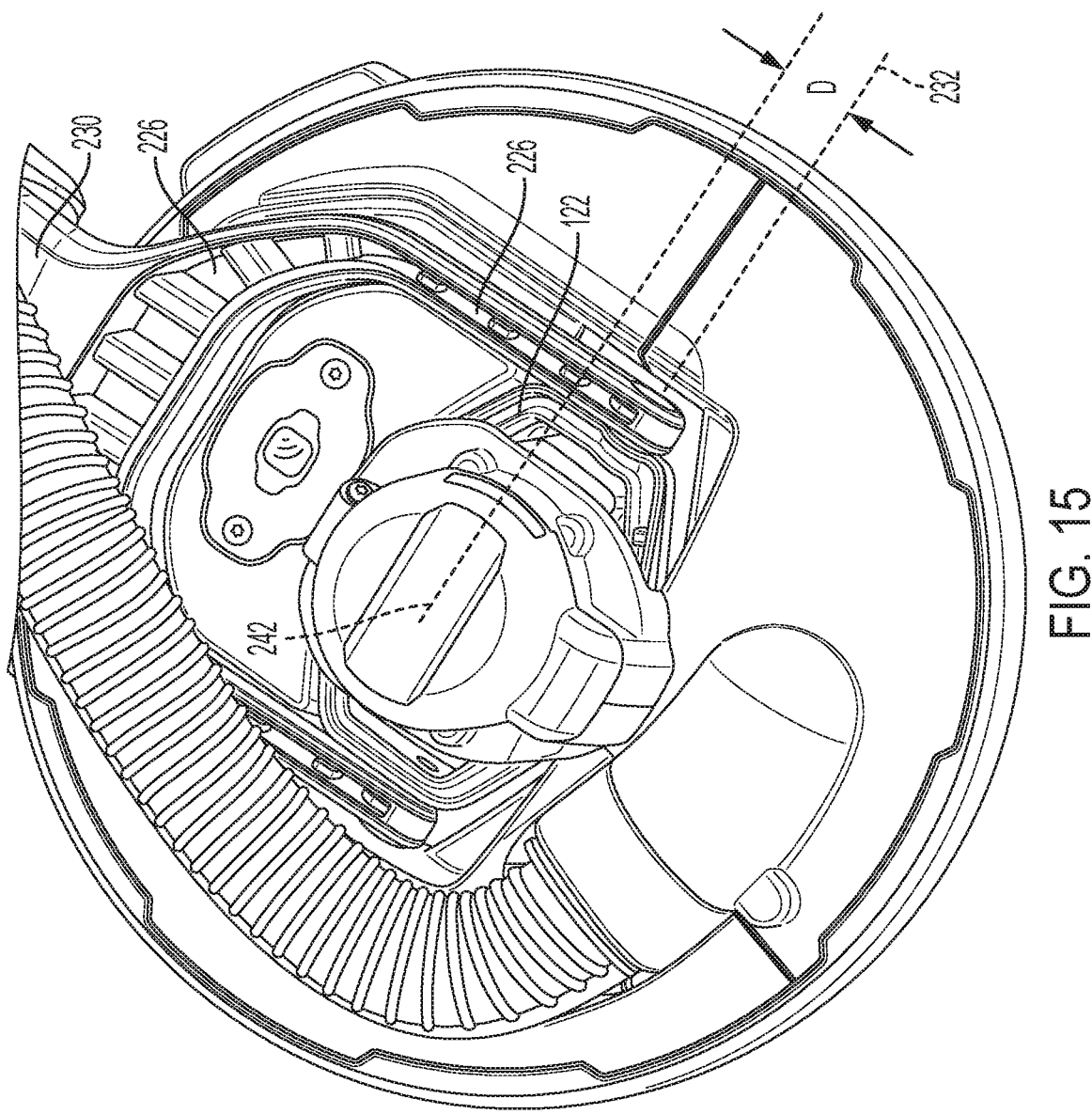
FIG. 15 shows a top view of the sanding head.

The pivot mechanism 110 will now be described with reference to FIGS. 4, 15 and 16.

Figure 5:
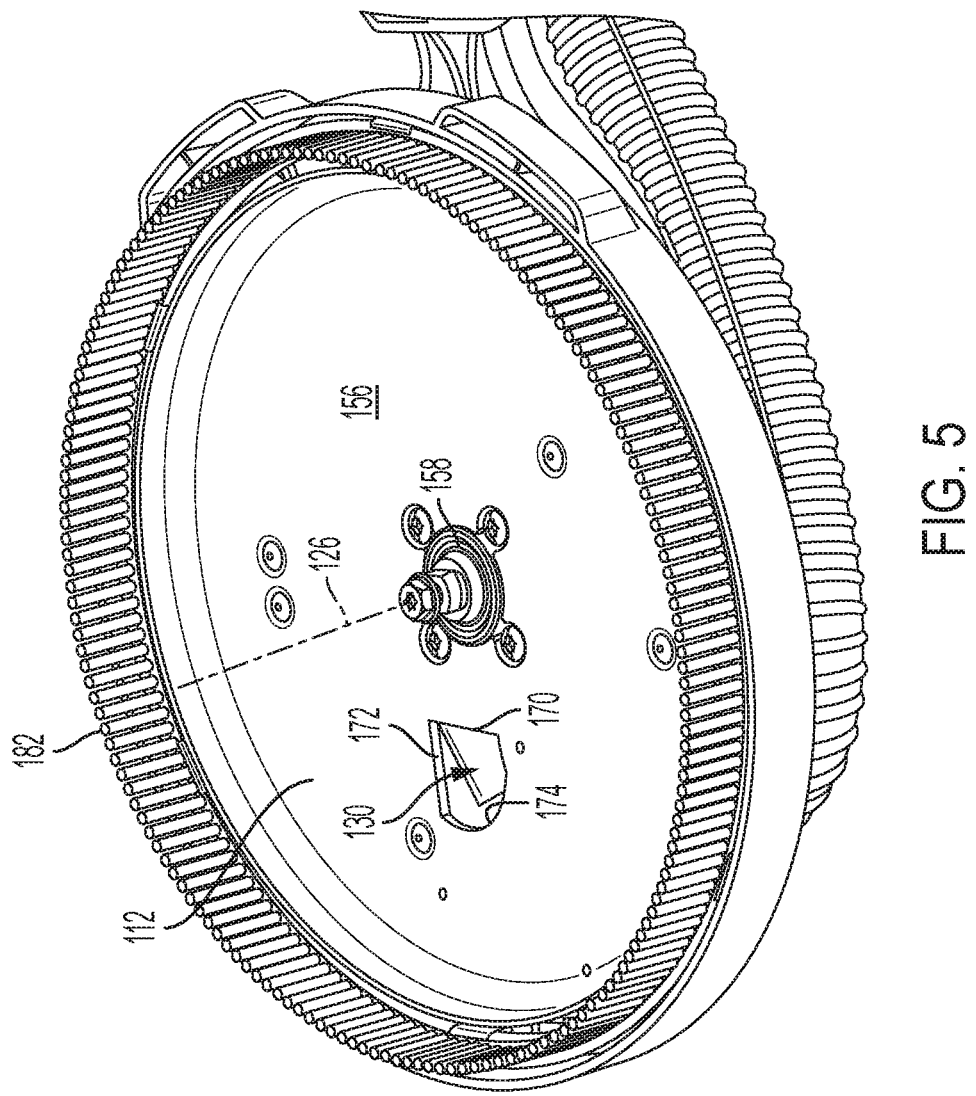
FIG. 5 shows an underside view of the sanding head with the platen removed.

Attached to the end of the first pole 196 in a fixed manner is an end housing 220 (see FIGS. 1 and 2) comprising two clam shells 222 attached to each other using screws (only one clam shell is shown in FIG. 4). The pivot mechanism 110 connects the sanding head 100 to the first pole 196 via the end housing 220.

The pivot mechanism 110 comprises a fork 224 having two arms 226, a central interconnecting section 228 and a pole support section 230. The two arms 226 extend in parallel in a forward direction from the ends of the central interconnecting section 228 in a symmetrical manner. The pole support section 230 connects to the centre of the interconnection section 228 on the opposite side of the two arms 226 and projects in a rearward direction opposite but parallel to that of the two arms 226.

Formed in each side of the gear housing 122 in a symmetrical manner are threaded apertures. The axis 232 of the of the apertures are aligned with each other and are horizontal. Formed in the ends of the two arms 226 are apertures. When the fork 224 is attached to the sanding head 100, the ends of the two arms 226 align with the apertures formed in the gear housing. A bolt 234 is passed through each aperture in the end of each arm 226 and screw into the threaded aperture in the side of the gear housing 122 to attach the fork 224 in a pivotal manner. The fork 224 can pivot around the bolts 234 about a horizontal sideways axis 232.

Rigidly mounted in a recess formed in the end of the pole support section 228 is the rear half of an axle 234. The axle 234 projects rearwardly. Formed in the end housing 220 is an elongate recess 236. The recess 236 extends in a direction parallel to the longitudinal axis of the first pole 196. The forward half of the axle 234 is mounted inside of the recess 236 via two bearings 240 supported by the end housing in the side walls of the recess. The bearings 240 allow the axle to rotate within the recess. The axle can rotate about an axis which is parallel to the longitudinal axis of the first pole 196 and which passes through the length of the second smaller passage 148 of the elongate body 102. This allows the fork 224, together with sanding head 100, to pivot about an axis which is parallel to the longitudinal axis of the first pole 196 and which passes through the length of the second smaller passage 148 of the elongate body 102. The axis also crosses the output axis 126 of the drive spindle.

The sanding head 100 has a centre of gravity 242. As best seen in FIG. 15, the axis of pivot 232 of the fork 224 on the sanding head 100 is located forward (distance D in FIG. 15) of the centre of gravity 242. Furthermore, the axis of pivot 232 of the fork 224 on the sanding head 100 100 is located forward of the drive axis 126 of the output spindle 118. This allows the sanding head 100, which can freely rotate about the bolts 234, to automatically pivot to an angular position where it is parallel to a wall when the sanding head 100 is raised by an operator.

Figure 16:
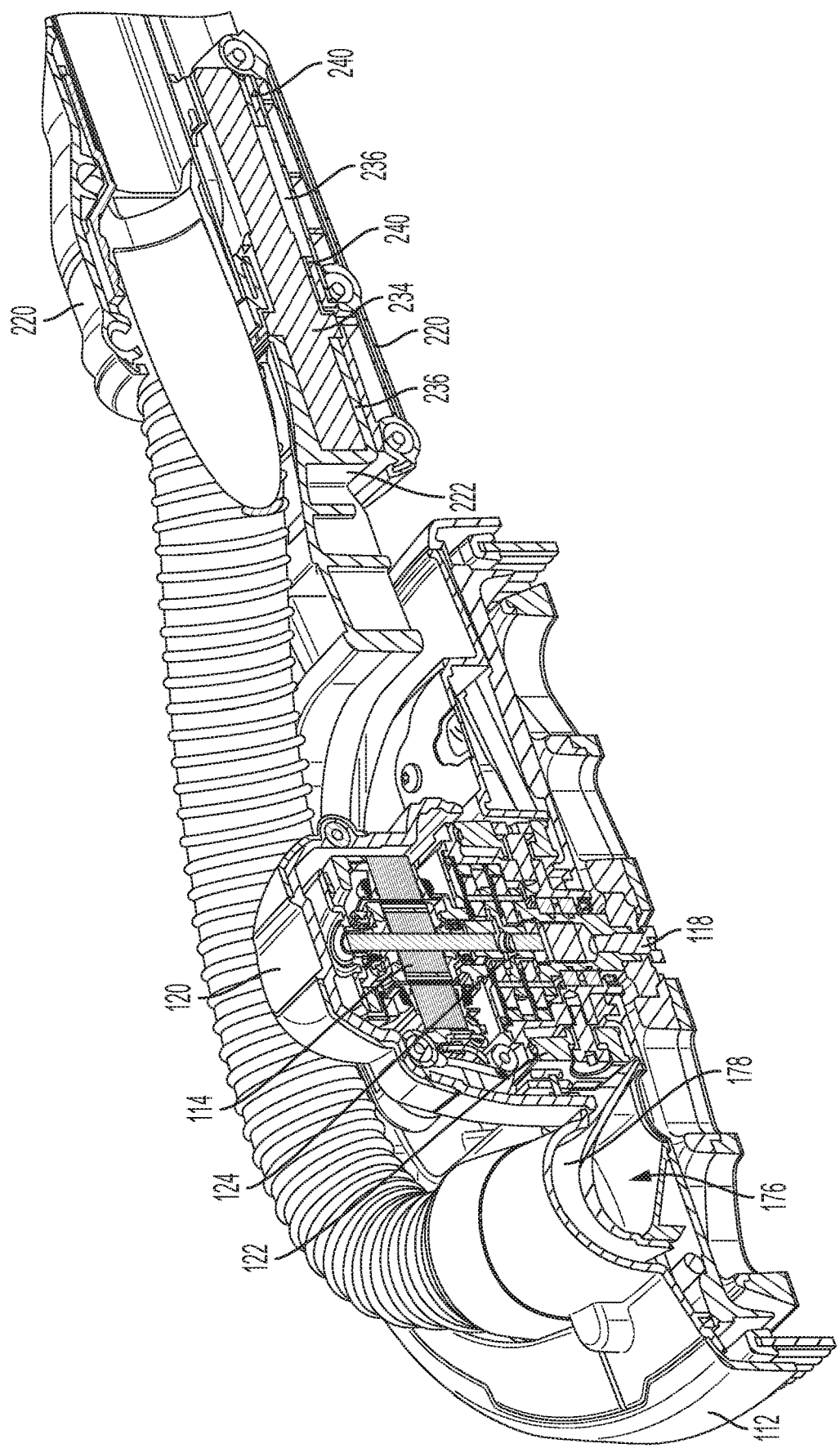
FIG. 16 shows a vertical cross section of the sanding head and lower end of the first pole 196.

When the plane of the platen 116 is parallel to the longitudinal axis of the elongate body 102 as shown in FIG. 16, the axis of rotation of the axle is located below the centre of gravity 242 of the of the sanding head 100.

Figure 17:
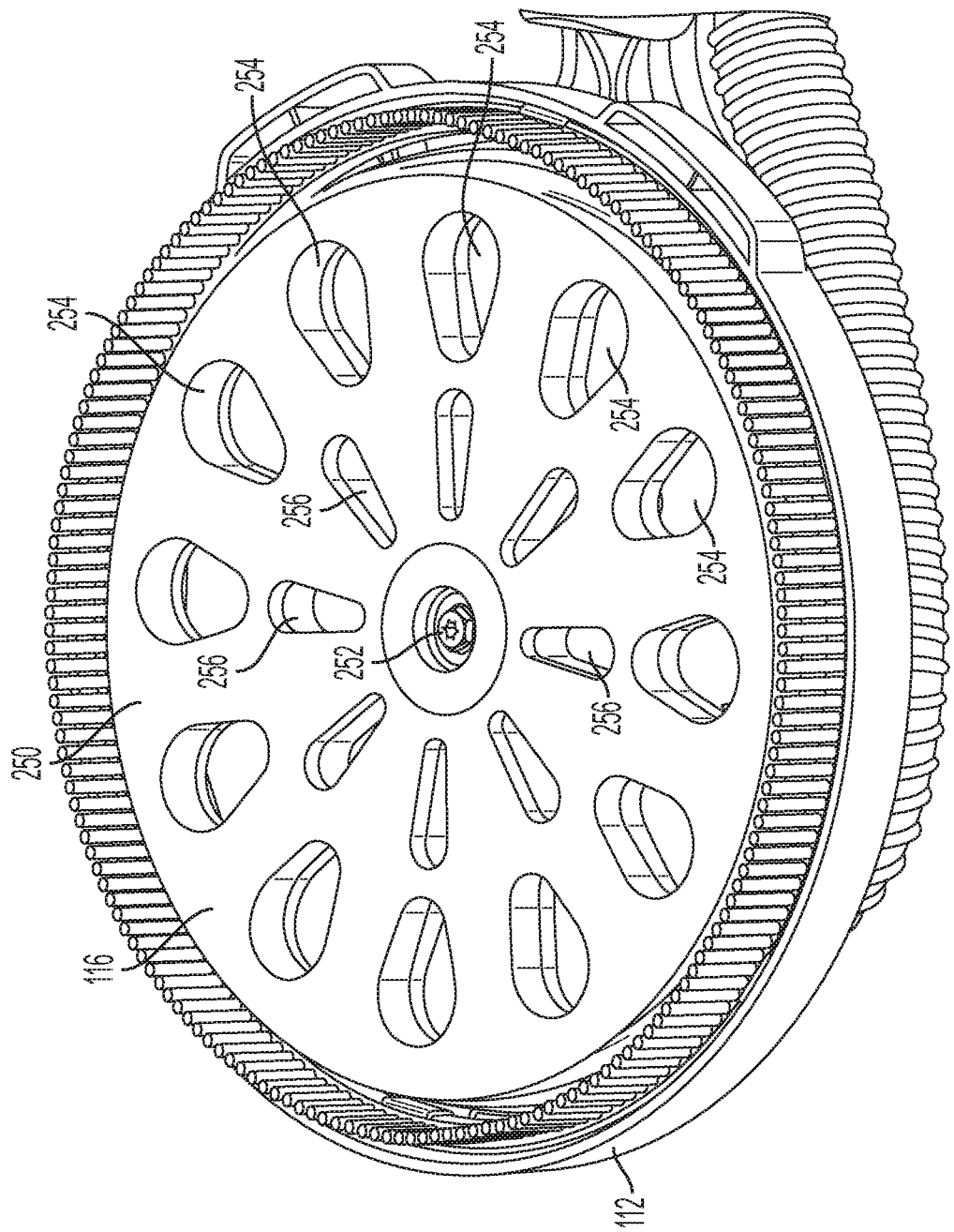
FIG. 17 shows the underside view of the sanding head including the platen.
Figure 18:
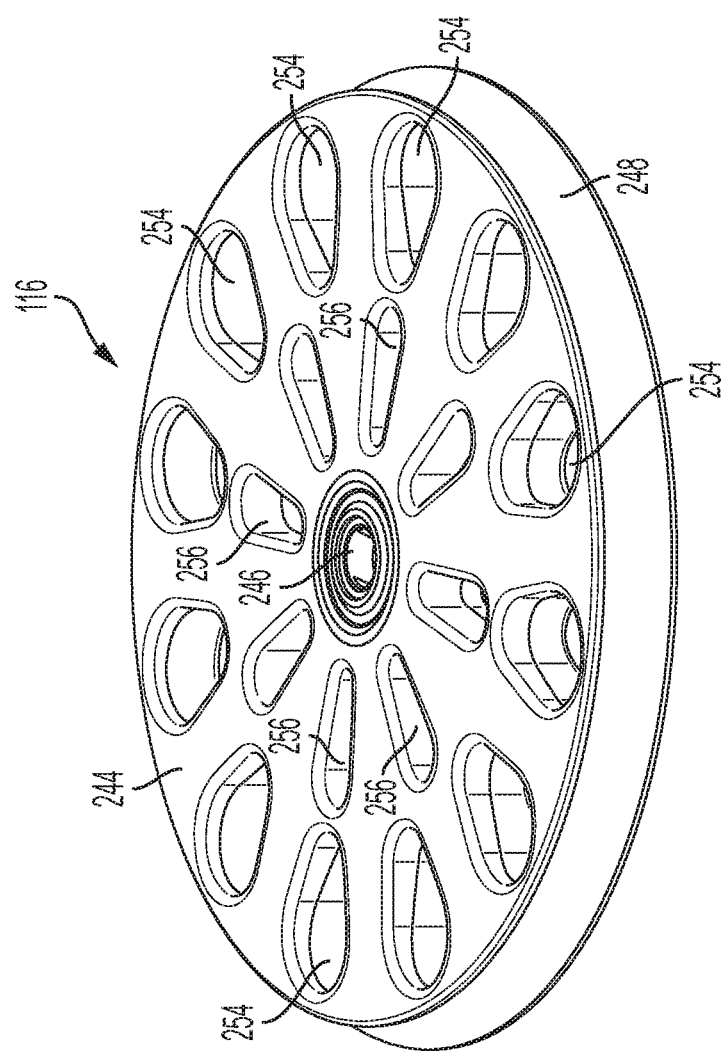
FIG. 18 shows the platen.

The design of the platen 116 will now be described with reference to FIGS. 17 and 18.

The platen 116 comprises a plastic disc 244 with a metal insert 246 located at the centre. Attached to the bottom of disk is layer made of a soft foam 248. Attached on the opposite side of the soft foam layer is a sheet of Velcro 250. The Velcro 250 is used to attach the sandpaper to the platen 116.

The platen 116 is attached to the output spindle 118 using a bolt 252. The platen 116 is circular and extends radially from the drive axis 126 in a direction perpendicular to the drive axis 126. Two sets of air holes 254, 256 are formed through the platen 116 to allow air and debris to pass through the platen 116. The first set 254 are located towards the outer edge of the platen and in a symmetrical manner around the axis 126. The holes 254 of the first set are tear shaped with the narrower end pointing towards the centre. The straight sides of the holes 254 align with the centre of the platen 116. The second set of holes 256 are located between the first set 254 and the centre of the platen 116 in a symmetrical manner. The holes 256 of the second set are smaller than those of the first set. The holes 256 of the second set are tear shaped with the narrower end pointing towards the centre. The straight sides of the holes 256 align with the centre of the plate 116.

Figure 6A:
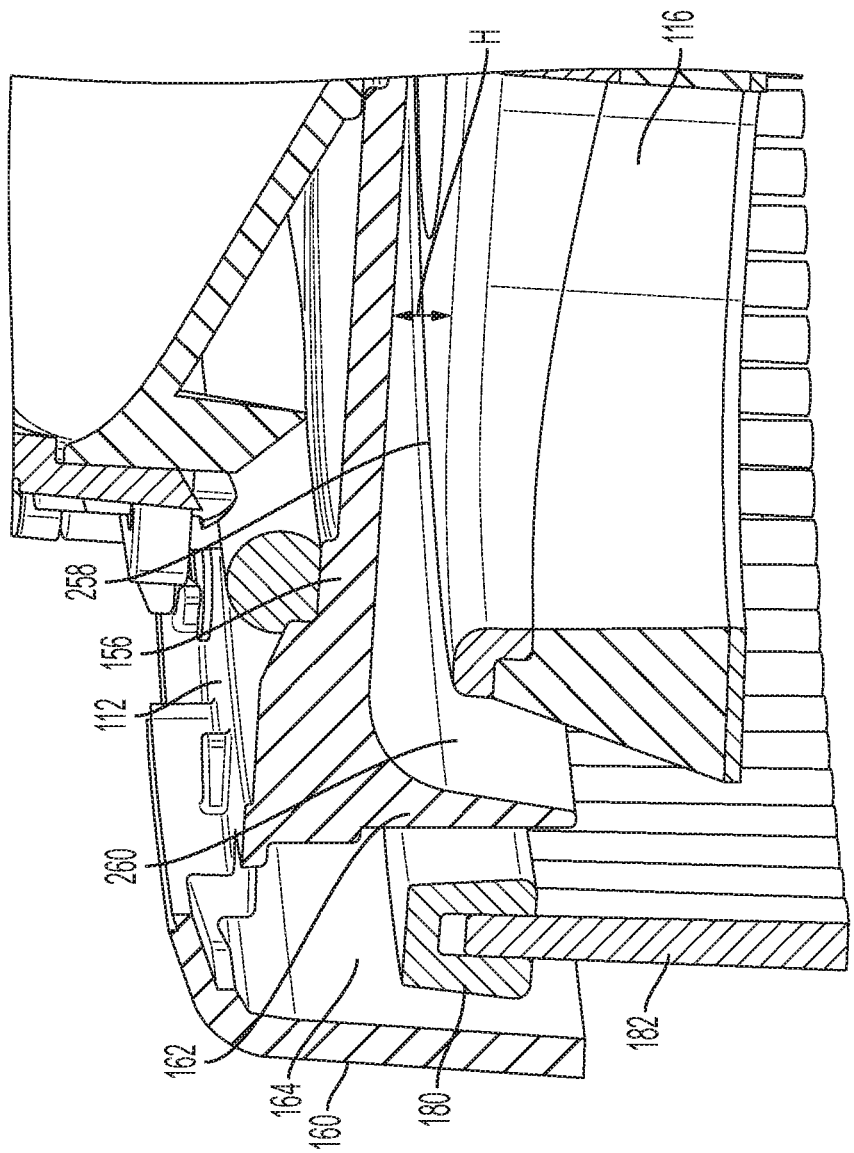
FIG. 6A shows a vertical cross-sectional view of the edge of the sanding head.
Figure 7:
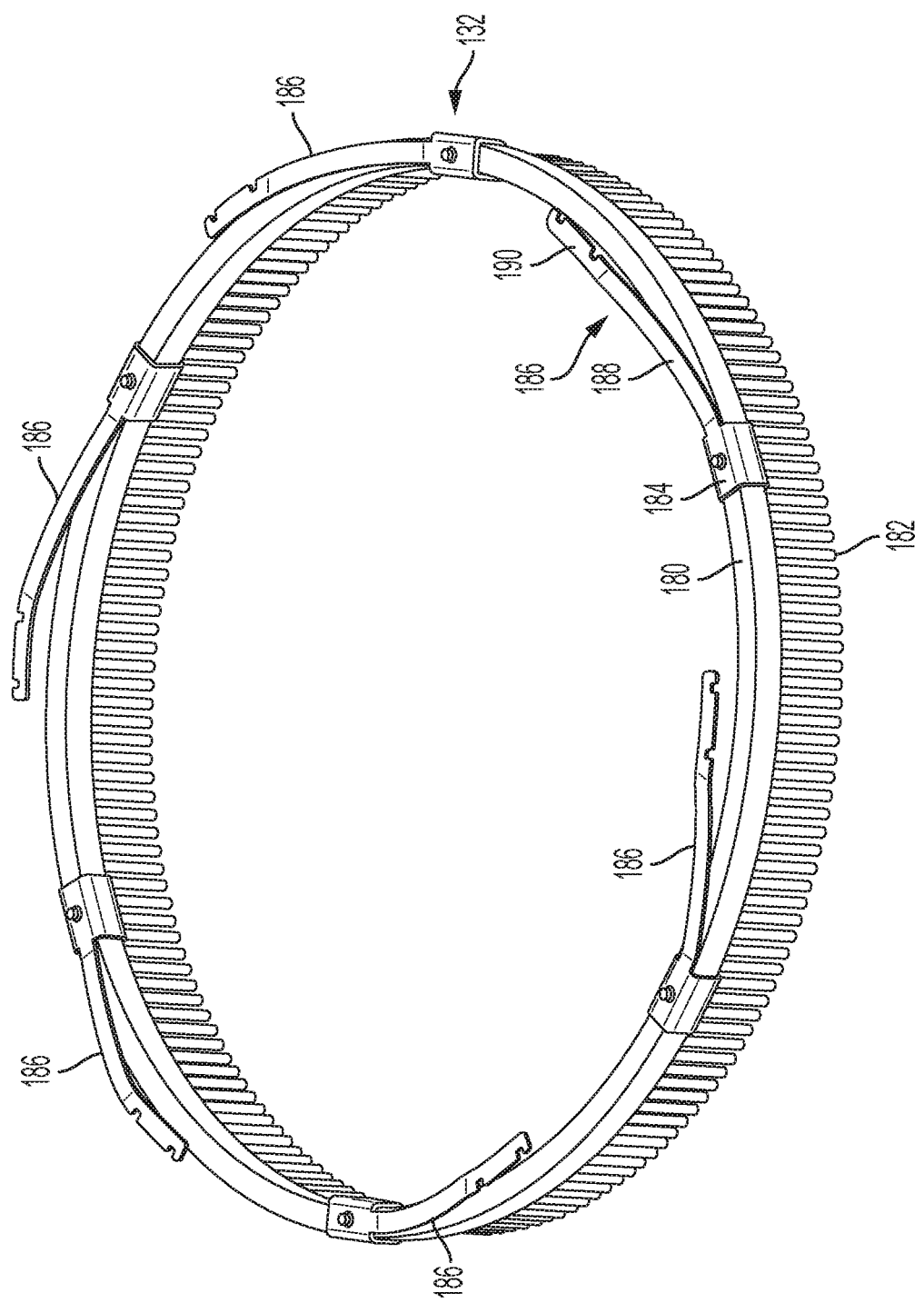
FIG. 7 shows a perspective view of the brush ring.

Referring to FIG. 6A, a space 258 is formed between the top of the platen 116 and the underside of the hood 112. In the present design, the size H of the space is kept to a minimum. This ensures that the air speed above the platen 116 is kept as high as possible. If the air speed slows, entrained dust and debris will deposit on the surface of the underside of the hood 112 and therefore will build up. By keeping the air speed high, the dust remains entrained and therefore can be drawn out the flexible pipe 128 due to the suction from a vacuum cleaner.

The air flow around the rotating platen 116 is improved due to the inner circular inner wall 162 which is adjacent the outer edge of the platen 116. The inner wall 162 locates between the edge of the paten and the bristles 182 of the brush ring 132. The inner wall 162 guides the moving air in a smooth manner and minimises the amount of contact between the moving air and the bristles 182 of the brush ring 132. If the moving air were to come into contact with the bristles 182, the air flow would become non-uniform as its passes through the bristles 182. Furthermore, the use of the inner wall 162 to separate the bristles 182 from the edge of the platen 116 minimises the amount of dust and debris that collects within the bristles 182.

The cross-sectional area of the gap 260 between the inner wall 162 and the edge of the platen 116 (shown by the hatchings 262 in FIG. 6B) is the same as that of the cross-sectional area of the flexible pipe 128 which in turn is the same as that of the first passageway 154 way in the two poles 196, 198.

Figure 19:
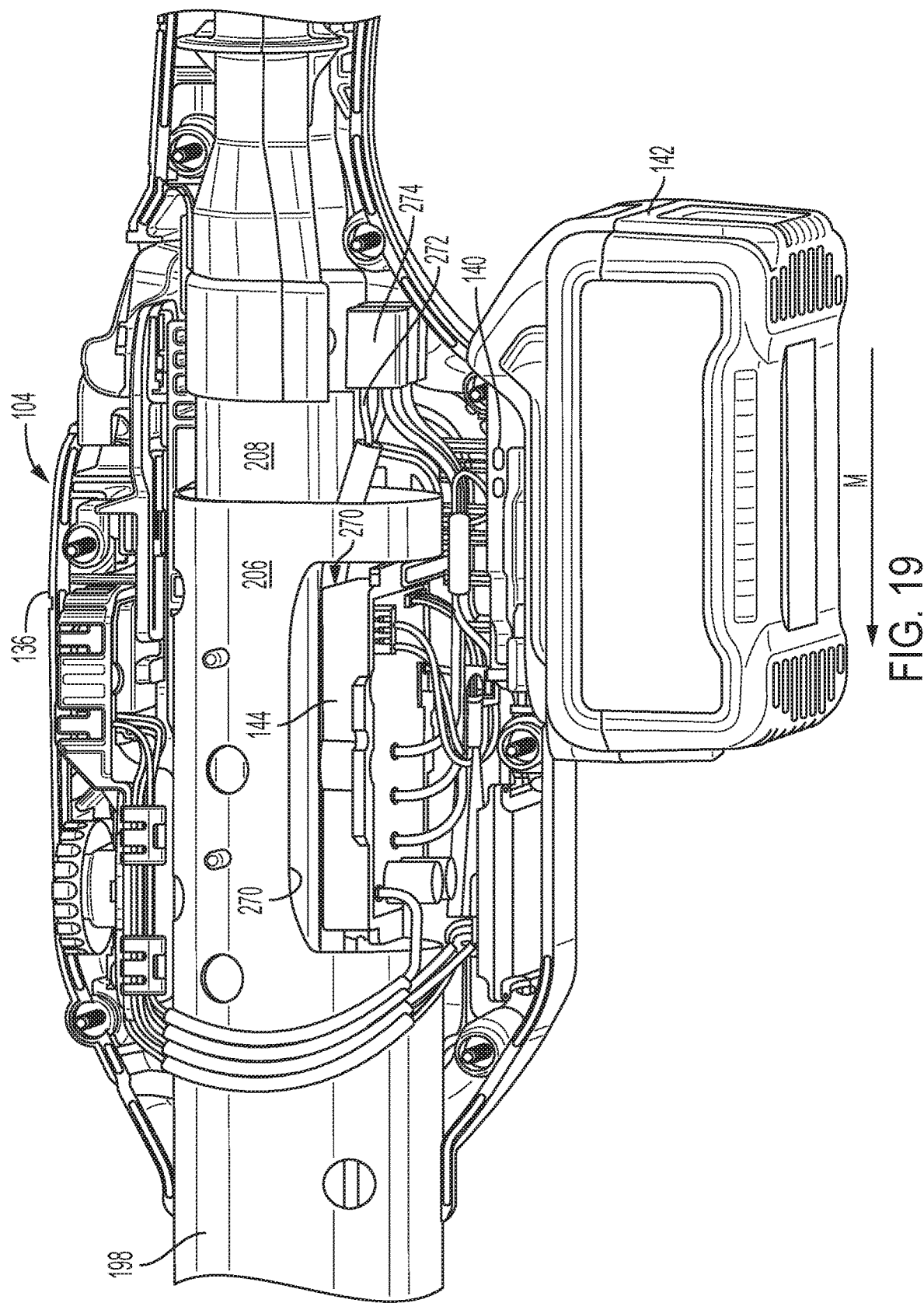
FIG. 19 shows the rear housing with one of the clam shells removed.
Figure 20:
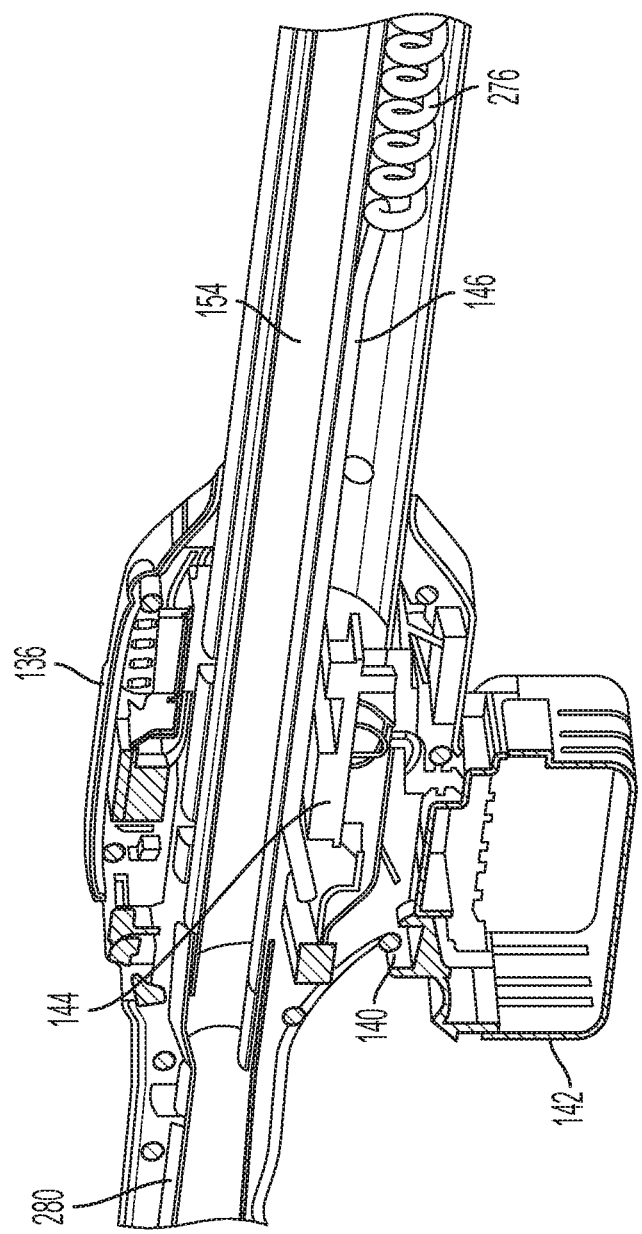
FIG. 20 shows a vertical cross section of the rear housing.

Referring to FIG. 19, the second pole 198 extends into the mount section 136 of the rear housing 104. A part 270 of the side wall first aluminium tube 206 of the second pole 198 has been removed to expose the surface of the second aluminium tube 208. The control electronics 144 are mounted in a control module having a housing made from heat conductive material. Where the part 270 of the first aluminium tube has been removed, the control module 144 is mounted inside of the first aluminium tube 206 adjacent the second aluminium tube 208. It will be appreciated that the control module can be mounted in direct contact with the second aluminium tube 208. This enables heat generated by the control electronics 144 in the control module 144 to be transferred to the second aluminium tube 208 via the housing of the control module, the housing of the control module and the second aluminium tube 208 being good heat conductors and transfer the heat away from the control module 144. Furthermore, during the operation of the pole sander, air is drawn through the second aluminium tube 208 by a vacuum cleaner. The air flow acts to cool the second aluminium tube 208 which in turn acts to cool the control module 144. It will be appreciated that the housing of the control module could be formed integrally with the second aluminium tube 208. It will be further appreciated that the control electronics 144 can be directly mounted adjacent to or direct contact with second aluminium tube 208 without a control module.

Figure 21:
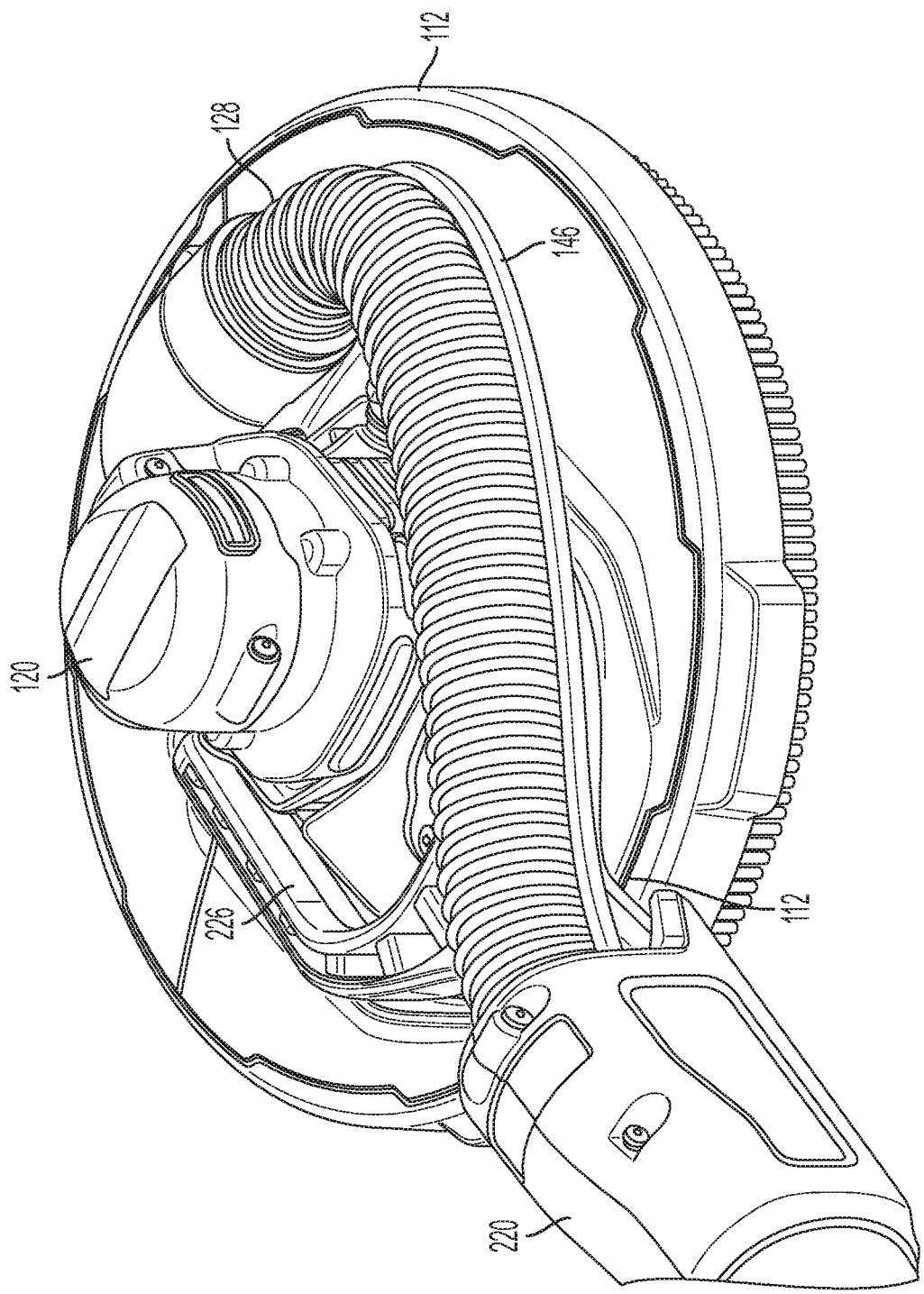
FIG. 21 shows a top perspective view of the sanding head.
Figure 22:
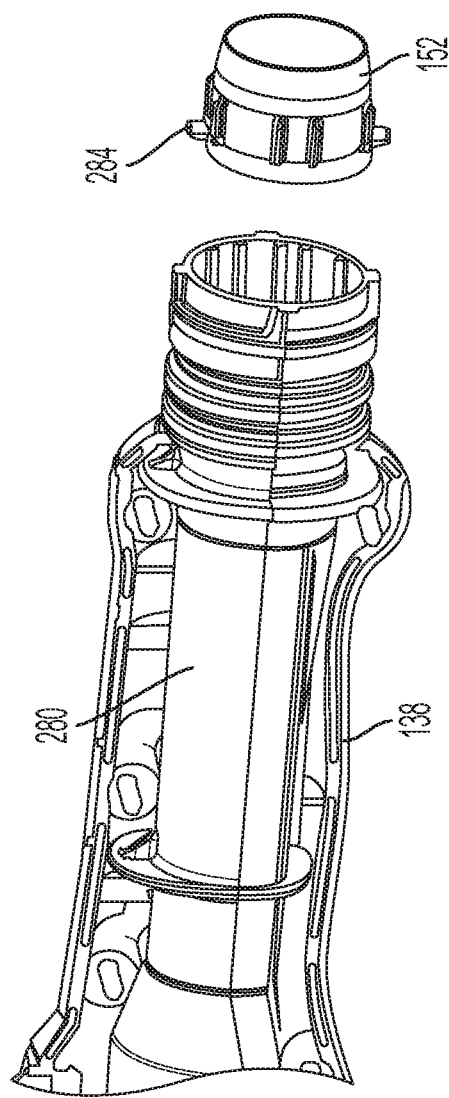
FIG. 22 shows the extension tube inside the handle section of the rear housing with the vacuum nozzle detached.
Figure 23:
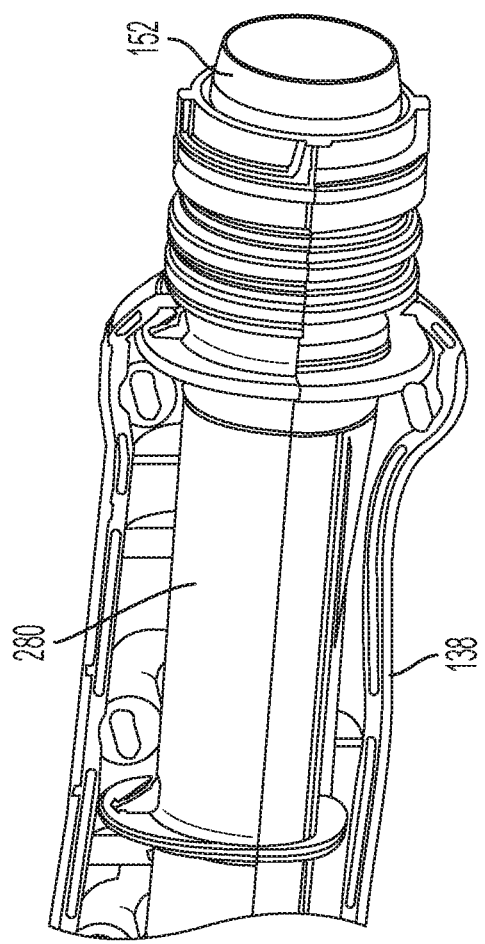
FIG. 23 shows the extension tube inside of the handle section of the rear housing with the vacuum nozzle attached.
Figure 24:
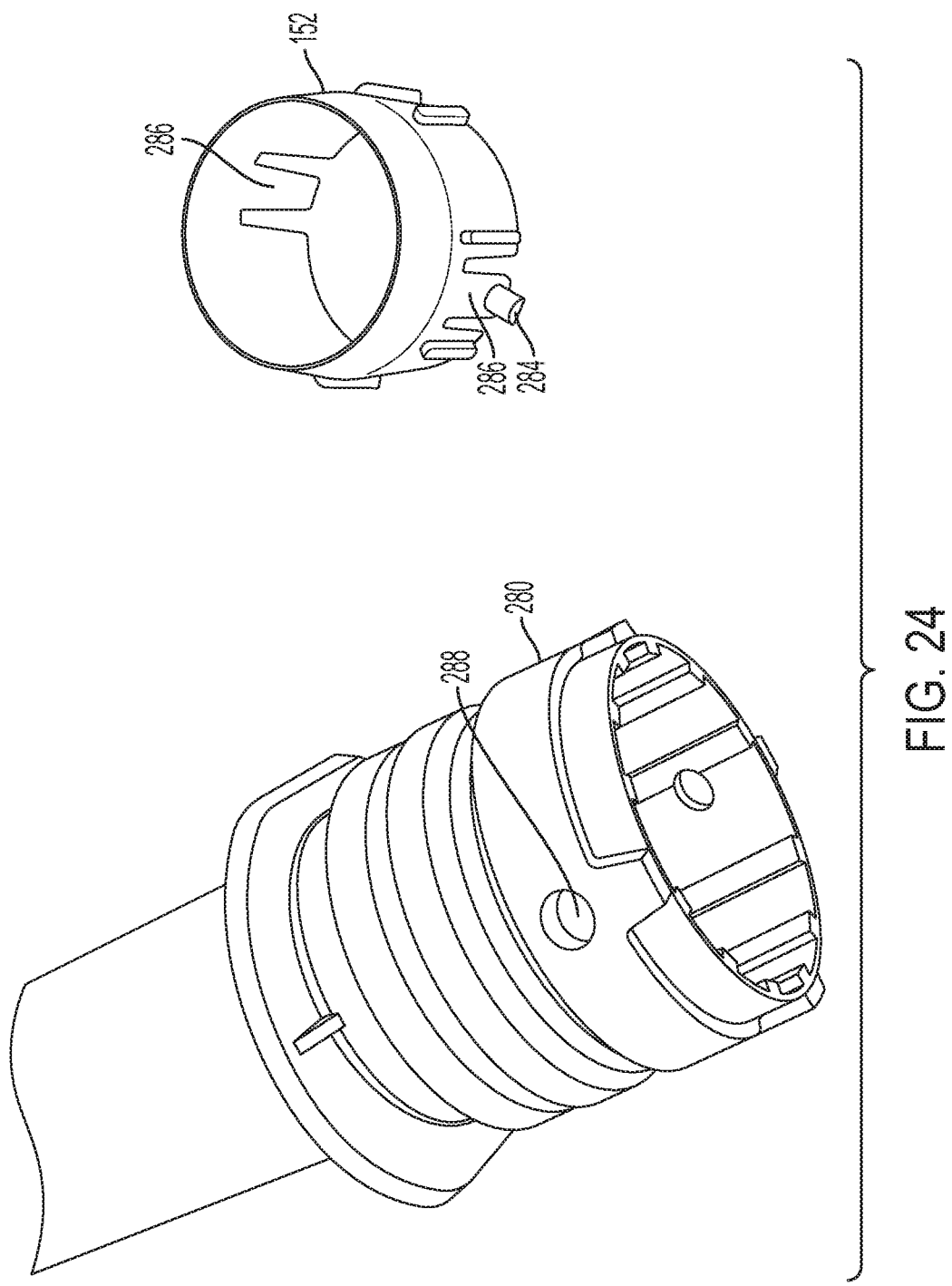
FIG. 24 shows the rear end of the extension tube with the vacuum nozzle detached.

The control electronics 144 are connected directly to the motor 114 using a single electrical cable 146 which carries the wires use to provide the electrical current to the windings of the brushless motor 114. One end of the cable 146 connects directly to the control electronics 144 via a soldering tag 272 which connects to electric interface 274. The other end connects directly to the motor 114. The cable 146 is continuous with no plugs or connectors being used so as avoid interfering with the signals generated by the control electronics 144 which are sent down the cable 146 to operate the motor 114. A central section 276 of the cable 146 located inside of the two poles 196, 198 is helical to enable the length of the cable 146 in a direction parallel to the longitudinal axis of the poles 196, 198 to extend or reduce depending on the relative telescopic positions of the two poles 196, 198. When the cable 146 exit the first pole 196 and pass across the pivot mechanism 110, it locates against the side of flexible pipe 128 as shown in FIG. 21. In order to maintain the position of the cable 146 relative to the flexible pipe 128, a tubular sheaf 278 surrounds both the cable 146 and the flexible pipe 128 as shown in FIGS. 26 and 27.

An extension tube 280 connects to the end of the second aluminium tube 208 of the second pole 198 which extends the first passageway 154 of the second pole 198 through the rear handle section 138 of the rear housing 104 and projects rearwardly of the handle section 138. A vacuum nozzle 152 is releasably attachable to the end of the extension tube 280 via a clip 282. The clip 282 comprises a first part formed on the vacuum nozzle 152 and a second part formed on the end of the extension tube 280. The first part comprises two pins 284, each pin 284 being mounted on the end of a resiliently deformable leg 286. The second part comprise two holes 288 formed through the side wall of the end of the extension tube 280 in corresponding locations to the pins 284. To attach the vacuum nozzle 152, the legs 286 are bent inwardly so that the pins 284 can slide inside of the end of the extension tube 280 as the vacuum nozzle 152 is slid into the extension tube 280. When the pins 284 align with the holes 288, the pins 284 are biased into the holes 288 by the resilient legs 286 bending back to their original position. Whilst the pins 284 are located in the holes 288, the vacuum nozzle 152 remains attached to the extension tube 280. To detach the vacuum nozzle 152 the pins 284 are pushed back into the apertures to disengage them from the holes 288. The nozzle 152 is slid out of the extension tube 280. The vacuum nozzle 152 can be attached to the hose of a vacuum cleaner. As the nozzle 152 can be easily attached and detached, a suitable design of nozzle 152 can be chosen depending on the type of vacuum cleaner utilised. Furthermore, if the nozzle 152 breaks it can be easily replaced.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A handheld pole sander comprising:
an elongate body having a first end and a second end extending along a longitudinal axis;
a rear housing mounted on the second end of the elongate body;
an electric motor electrically controlled by control electronics, wherein the control electronics are mounted within the rear housing; and
a sanding head attached via a pivot mechanism to the first end of the elongate body, wherein the sanding head comprises a hood and an output spindle projecting from the hood and rotatably driven by the electric motor;
wherein at least part of the elongate body comprises a heat conductive part being at least partially made of heat conductive material, and the elongate body includes a cut-out region through which the control electronics are received at least partially inside the elongate body adjacent to or in direct contact with the heat conductive part of the elongate body.

2. The handheld pole sander of claim 1, wherein the heat conductive part of the elongate body is made, at least in part, from metal.

3. The handheld pole sander of claim 1, wherein the heat conductive part of the elongate body is made at least in part from aluminum tubing.

4. The handheld pole sander of claim 1, further comprising a wire extending from the control electronics through the cut-out region of the elongate body and coupled to another component of the handheld pole sander.

5. The handheld pole sander of claim 1, wherein the elongate body comprises, at least in part, a first tube having an exterior body extending along the longitudinal axis and a second tube mounted in parallel to the first tube inside of the first tube, wherein the control electronics are mounted inside of the first tube adjacent to or in direct contact with the second tube.

6. The handheld pole sander of claim 5, wherein the cut-out region is formed through the exterior body of the first tube.

7. The handheld pole sander of claim 5, wherein the second tube forms a first passageway used to transport air through the length of the elongate body.

8. The handheld pole sander of claim 7, wherein a second passageway is formed between the first tube and the second tube, the second passageway forming a conduit through the elongate body.

9. The handheld pole sander of claim 8, wherein the electric motor is mounted on the hood and an electric cable passes through the conduit that connects between the control electronics and the electric motor.

10. The handheld pole sander of claim 9, wherein the electric motor is connected to the control electronics via a single continuous electric cable.

11. The handheld pole sander of claim 1, wherein the control electronics are mounted in a control module having a housing, the housing being constructed from heat conductive material.

12. The handheld pole sander of claim 11, wherein the housing of the control electronics is received at least partially through the cut-out region of the elongate body adjacent to or in direct contact with the heat conductive part of the elongate body.

13. The handheld pole sander of claim 12, wherein the housing of the control electronics is formed integrally with the part of the elongate body made from heat conductive material.

14. The handheld pole sander of claim 1, wherein the electric motor drives the output spindle via a gear transmission.

15. The handheld pole sander of claim 14, wherein the gear transmission comprises a planetary gear system.

\* \* \* \* \*